United States Patent
Kotani et al.

(10) Patent No.: US 8,058,773 B2
(45) Date of Patent: Nov. 15, 2011

(54) ULTRASONIC MOTOR AND ULTRASONIC VIBRATOR

(75) Inventors: Teruhisa Kotani, Tenri (JP); Masaki Hamamoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 460 days.

(21) Appl. No.: 12/418,258

(22) Filed: Apr. 3, 2009

(65) Prior Publication Data

US 2009/0256445 A1    Oct. 15, 2009

(30) Foreign Application Priority Data

Apr. 10, 2008 (JP) ................................ 2008-102387

(51) Int. Cl.
*H01L 41/04* (2006.01)
*H02N 2/12* (2006.01)

(52) U.S. Cl. .............................. 310/323.16; 310/323.02

(58) Field of Classification Search ................ 310/323
See application file for complete search history.

(56) References Cited

U.S. PATENT DOCUMENTS

| | | | |
|---|---|---|---|
| 6,051,912 A * | 4/2000 | Gonda ................... | 310/323.02 |
| 7,157,836 B2 * | 1/2007 | Kinoshita ............... | 310/348 |
| 7,224,102 B2 * | 5/2007 | Miyazawa .............. | 310/323.02 |
| 7,378,777 B2 * | 5/2008 | Moteki et al. .......... | 310/323.16 |
| 7,514,843 B2 * | 4/2009 | Nagahama et al. ..... | 310/317 |
| 7,834,523 B2 * | 11/2010 | Higashionji et al. ... | 310/345 |
| 7,839,053 B2 * | 11/2010 | Hamasaki et al. ...... | 310/323.01 |
| 7,929,382 B2 * | 4/2011 | Yamazaki ............... | 368/157 |
| 2004/0256957 A1 | 12/2004 | Miyazawa | |
| 2005/0253484 A1 | 11/2005 | Kishi et al. | |
| 2006/0283253 A1* | 12/2006 | Koc et al. .............. | 73/662 |
| 2010/0181870 A1* | 7/2010 | Nagaoka et al. ....... | 310/323.16 |

FOREIGN PATENT DOCUMENTS

| | | | |
|---|---|---|---|
| JP | 59-38333 U | | 3/1984 |
| JP | 1-119903 | | 8/1989 |
| JP | 2001-169573 A | | 6/2001 |
| JP | 2001327180 A | * | 11/2001 |
| JP | 2002-349052 A | | 12/2002 |
| JP | 2004-066189 A | | 3/2004 |
| JP | 2004159403 A | * | 6/2004 |
| JP | 2004-248399 A | | 9/2004 |
| JP | 2004-320980 A | | 11/2004 |
| JP | 2004-336862 A | | 11/2004 |
| JP | 2005-73341 A | | 3/2005 |
| JP | 2005-073465 A | | 3/2005 |
| JP | 2006-014512 A | | 1/2006 |
| JP | 2006211411 A | * | 8/2006 |
| JP | 2006230140 A | * | 8/2006 |
| JP | 2007-336685 A | | 12/2007 |

* cited by examiner

OTHER PUBLICATIONS

Japanese Office Action mailed May 10, 2011 with English translation.

*Primary Examiner* — Jaydi San Martin
(74) *Attorney, Agent, or Firm* — Birch, Stewart, Kolsach & Birch, LLP

(57) ABSTRACT

An ultrasonic motor includes a driven object, a piezoelectric element for driving the driven object, a vibration plate including a notch having an inner peripheral surface of an arc-shaped form having a central angle larger than 180 degrees and being vibrated by the piezoelectric element, and a contact portion made of a material different from that of the vibration plate, having a portion overlapping the piezoelectric element in a plan view and being smaller in thickness than the piezoelectric element, attached to the notch of the vibration plate by press fitting or forced fitting and being in contact with the driven object. Thereby, the ultrasonic motor can have a high shock resistance and a high wear resistance, and can be driven with high efficiency.

21 Claims, 19 Drawing Sheets

FIG.5
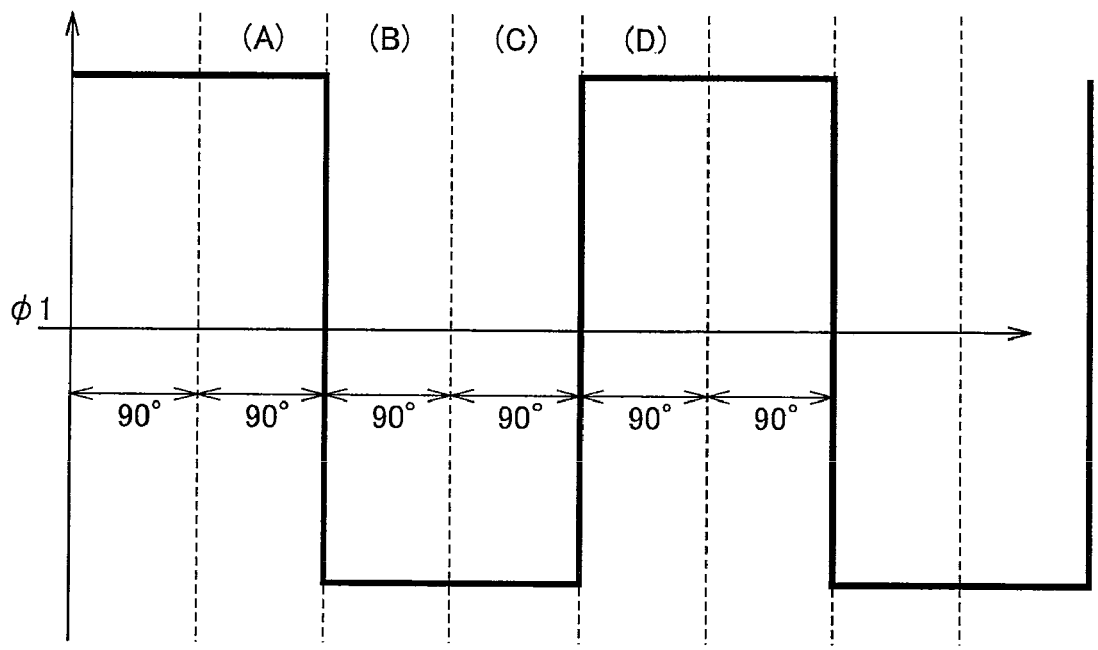
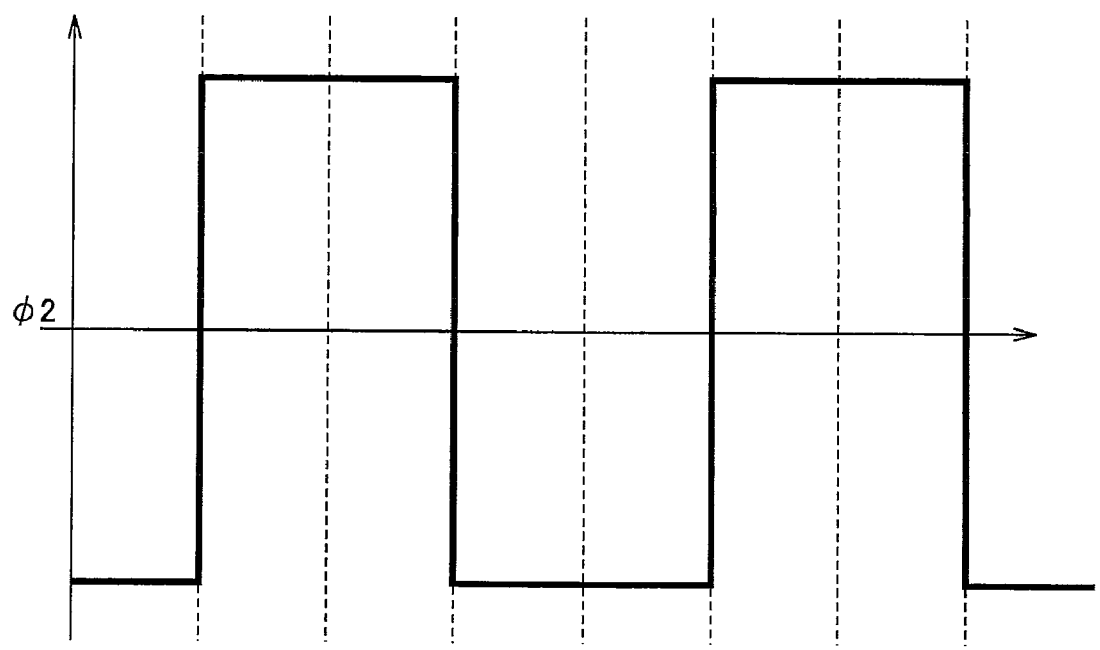
40, 41 φ1
42, 43 φ2

45, 46 φ1
47, 48 φ2 ial element particularly for an autofocus drive mechanism of
ULTRASONIC MOTOR AND ULTRASONIC VIBRATOR This nonprovisional application is based on Japanese Patent Application No. 2008-102387 filed on Apr. 10, 2008 with the Japan Patent Office, the entire contents of which are hereby incorporated by reference.

BACKGROUND OF THE INVENTION

1. Field of the Invention

The present invention relates to an ultrasonic motor and the like.

2. Description of the Background Art

Ultrasonic motors having an ultrasonic vibrator that uses a vibration of a piezoelectric element have been used. The ultrasonic vibrator has such distinctive features that it is not affected by magnetism, is small in size, has a high torque, has a high response speed and is at rest when it is not energized. These and other features are different from those of an electromagnetic motor. Therefore, the ultrasonic motor is a potential element particularly for an autofocus drive mechanism of a small camera lens and the like.

The piezoelectric element used in the ultrasonic vibrator is formed of a brittle material such as ceramic so that it has a poor shock resistance. It has been known that wear due to driving occurs in contact portions of the ultrasonic vibrator and an external driver such as a rotor, resulting in deterioration of performance of the ultrasonic motor. For example, Japanese Patent Laying-Open No. 2005-073341 has proposed an ultrasonic vibrator having a contact portion that is made of a material such as stainless steel (SUS) or the like having a high shock resistance and a high wear resistance, and is fixed to a vibration plate.

FIGS. 18 and 19 show examples of the above ultrasonic vibrator that has a high shock resistance and a high wear resistance, and particularly shows contact portions in ultrasonic vibrators 900 and 904 disclosed in Japanese Patent Laying-Open No. 2005-073341.

Contact portion 901 in ultrasonic vibrator 900 shown in FIG. 18 has an arc-shaped outer periphery, which is in contact with a semicircular inner peripheral surface of a notch formed in a vibration plate 903. Contact portion 901 is attached to vibration plate 903 by an adhesive or the like.

According to the above structure, adhesivity of the adhesive must be larger than a pulling force in a longitudinal direction of the vibration plate, i.e., in an x-axis direction in FIG. 18. In this case, contact portion 901 is disengaged from the vibration plate when the pulling force in the x-direction larger than the above adhesivity is applied between contact portion 901 and the vibration plate during the attaching operation or driving of ultrasonic vibrator 900.

A vibration plate 905 of an ultrasonic vibrator 904 shown in FIG. 19 has a notch having an arc-shaped inner peripheral surface, and is provided at the notch with a projection 906. A contact portion 907 is provided with an engagement portion 908. Projection 906 is engaged with engagement portion 908 to prevent disengagement of contact portion 907 from vibration plate 905.

According to the above structures, however, each of contact portion 907 and vibration plate 905 has the arc-shaped portion and the linear portion in a mixed fashion, which complicates working thereof. Further, as shown in FIG. 19, a space is present between vibration plate 905 and contact portion 907 in ultrasonic vibrator 904. This space prevents efficient transmission of the vibration of vibration plate 905 to contact portion 907, resulting in loss of an output power of the ultrasonic vibrator.

SUMMARY OF THE INVENTION

The invention has been made in view of the above problems, and an object of the invention is to provide an ultrasonic motor that has high resistances to shock and wear, and can operate with high efficiency.

An ultrasonic motor according to the invention has a driven object; a piezoelectric element for driving the driven object; a vibration plate including a notch having an inner peripheral surface of an arc-shaped form having a central angle larger than 180 degrees, and being vibrated by the piezoelectric element; and a contact portion made of a material different from that of the vibration plate, having a portion overlapping the piezoelectric element in a plan view and being smaller in thickness than the piezoelectric element, attached to the notch of the vibration plate by press fitting or forced fitting and being in contact with the driven object.

According to the above structure, since the outer peripheral surface of the contact portion can be in contact with the arc-shaped inner peripheral surface of the notch of the vibration plate throughout its range, the vibration occurring in the vibration plate can be efficiently transmitted to the contact portion.

The contact portion may be a circular plate having a radius substantially equal to a radius of curvature of the arc-shaped form. According to this structure, the contact portion can be formed only by a machine work using a rotary motion such as lapping, grinding, cutting or the like so that the contact portion can be formed easily.

The contact portion desirably has a smaller thickness than the vibration plate. This structure facilitates the arrangement of the contact portion in a position within a range of the thickness of the vibration plate.

The contact portion may be made of a material having a higher hardness than the vibration plate. This structure can improve the wear resistance of the ultrasonic vibrator, and therefore can increase a lifetime of the ultrasonic motor.

The vibration plate may be made of a metal material, and the contact portion may be made of a ceramic material. This structure can provide the ultrasonic motor having the high resistances to shock and wear.

The metal material may be stainless steel, and the ceramic material may be silicon nitride ($Si_3N_4$). This structure can provide the ultrasonic motor that has high resistances to shock and wear, and can perform the driving with high efficiency.

A portion of the vibration plate other than the notch may have a substantially rectangular plate-like form. This structure can provide the ultrasonic motor having the rectangular plate-like form that offers a high wear resistance.

The arc-shaped form may have a center located at a middle portion in a direction of a short side of the rectangular plate-like form. According to this structure, the vibration plate, contact portion and piezoelectric element are arranged symmetrically with respect to a line on a vibration plane. Therefore, an elliptic motion produced by a combination of a longitudinal primary resonation and a bending secondary resonation can easily exhibit the same locus in both the rotating directions. Consequently, the ultrasonic motor having good controllability can be obtained.

Opposite ends of the arc-shaped form may be located on a short side and a long side of the vibration plate of the rectangular plate-like form. According to this structure, the contact point between the contact portion and the driven object can be set in the vicinity of each of the short and long sides of the vibration plate so that it is possible to increase flexibility in positional relationship between the ultrasonic vibrator and the driven object.

The ultrasonic motor may further include a different notch and a different contact portion having the same forms as the notch and the contact portions, respectively, in addition to the notch and the contact portion. According to this structure, the ultrasonic vibrator and the driven object can be in contact with each other in a plurality of positions. Therefore, the ultrasonic motor can perform the driving with high efficiency. The contact portions may be arranged to increase symmetry of the ultrasonic vibrator, whereby the ultrasonic motor can perform the driving with further high efficiency.

The vibration plate may have an arc-shaped outer peripheral surface, the contact portion may be arranged in a position of an end of the arc-shaped outer peripheral surface or in another position of the arc-shaped outer peripheral surface, and the driven object may be a rotor having a circular inner peripheral surface being in contact with (circumscribed) in the arc-shaped outer peripheral surface, The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows phases of input voltages of the ultrasonic vibrator of the first embodiment.

DESCRIPTION OF THE PREFERRED EMBODIMENTS

First Embodiment

Referring to FIGS. 1 to 7, an ultrasonic motor 1 of a first embodiment will be described below.

Figure 1:
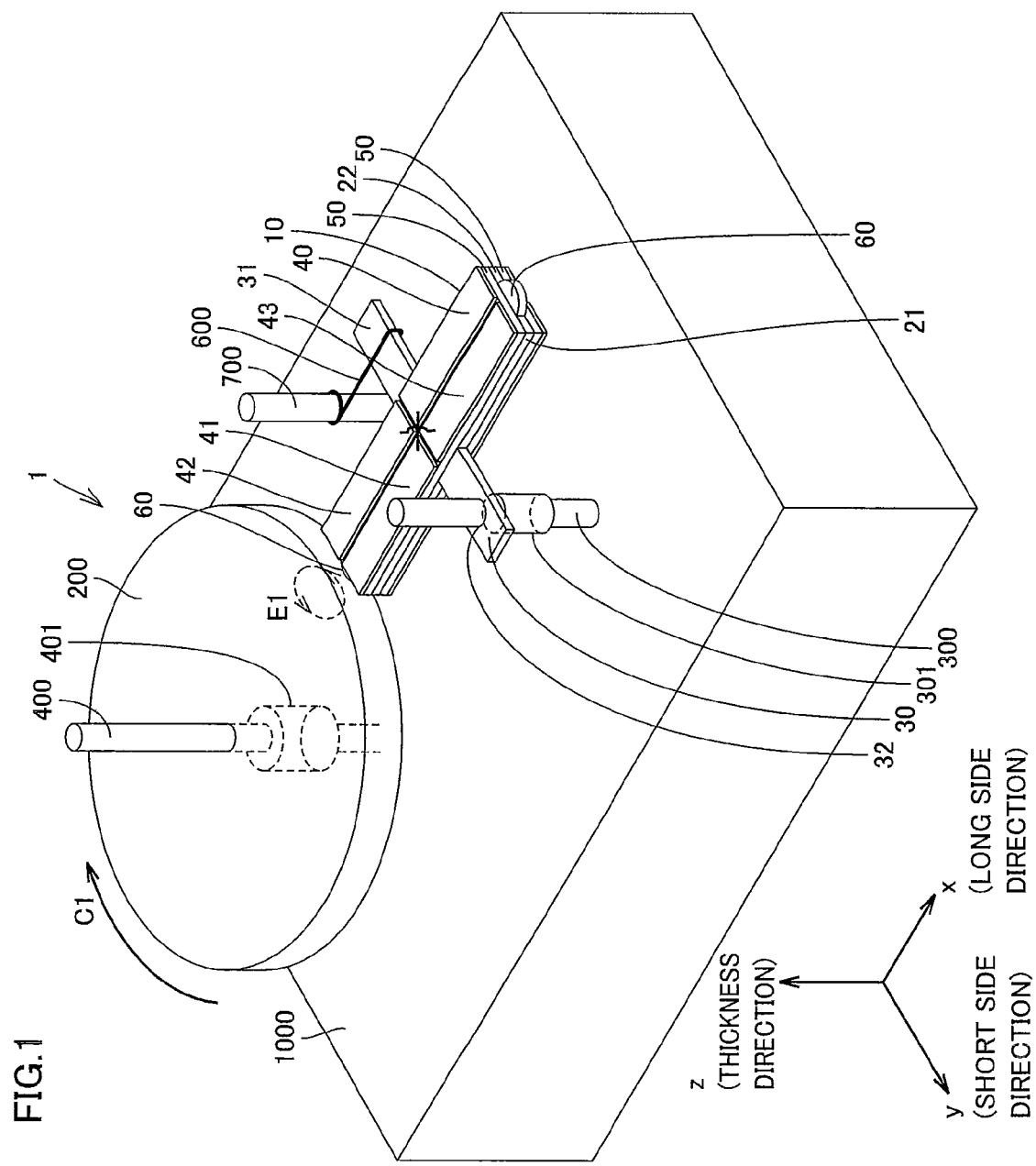
FIG. 1 is a schematic view of an ultrasonic motor of a first embodiment.

As shown in FIG. 1, ultrasonic motor 1 of the first embodiment includes an ultrasonic vibrator 10 and a rotor 200 driven by ultrasonic vibrator 10. Ultrasonic motor 1 includes a vibrator support shaft 300 and a rotor support shaft 400 connected to a main body 1000 of a device.

Rotor 200 takes a circular plate-like form, and has a thickness of 1.5 mm and an outer diameter of 10 mm. Rotor support shaft 400 is arranged in the center of rotor 200. Rotor support shaft 400 is fixed to main body 1000. Rotor 200 is preferably made of stainless steel (SUS). A rotor support 401 is arranged on rotor support shaft 400 for adjusting a vertical position of rotor 200. Thereby, rotor 200 is supported at a predetermined height by rotor support 401. Rotor support 401 holds rotor 200 only in its z-direction, and does not affect the rotation of rotor 200 on the x-y plane.

<Whole Structure>

The whole structure of the ultrasonic motor will now be described with reference to FIG. 1. Ultrasonic motor 1 has ultrasonic vibrator 10. Ultrasonic vibrator 10 has a vibration plate 21. A support projection 30 supports vibration plate 21 substantially at the middle portion of a long side of vibration plate 21, i.e., near a position of a node of the longitudinal vibration. A contact unit 60 is arranged substantially at a center of a short side of vibration plate 21. Support projection 30 has a circular through hole 32. Support projection 30 is rotatably connected to vibrator support shaft 300 for rotation on the x-y plane around the z-axis. Vibrator support shaft 300 is provided with a vibrator support 301 for adjusting a vertical position of ultrasonic vibrator 10, and ultrasonic vibrator 10 is fixed at a predetermined vertical position. Vibrator support 301 holds ultrasonic vibrator 10 only in the z-direction, and does not affect the rotation of ultrasonic vibrator 10 on the x-y plane.

Ultrasonic vibrator 10 has electrode sets each including two electrodes 40, 41, 42, 43 or 44, and also has two piezoelectric elements 50. Electrodes 40, 41, 42, 43 and 44 are electrically connected to a control device 500 (not shown) for receiving predetermined signals.

In ultrasonic vibrator 10 of the embodiment, when electrodes 40, 41, 42, 43 and 44 receive the electric signals, piezoelectric element 50 vibrates using an inverse piezoelectric effect. The vibration of piezoelectric element 50 causes the vibration of ultrasonic vibrator 10, which is transmitted to contact portion 60. Therefore, a tip end of contact portion 60 vibrates to exhibit an oval locus indicated by an arrow E1. Consequently, rotor 200 in contact with contact portion 60 moves along a circular path C1. Thus, rotor 200 rotates around rotor support shaft 400.

<Ultrasonic Vibrator>

Figure 2:
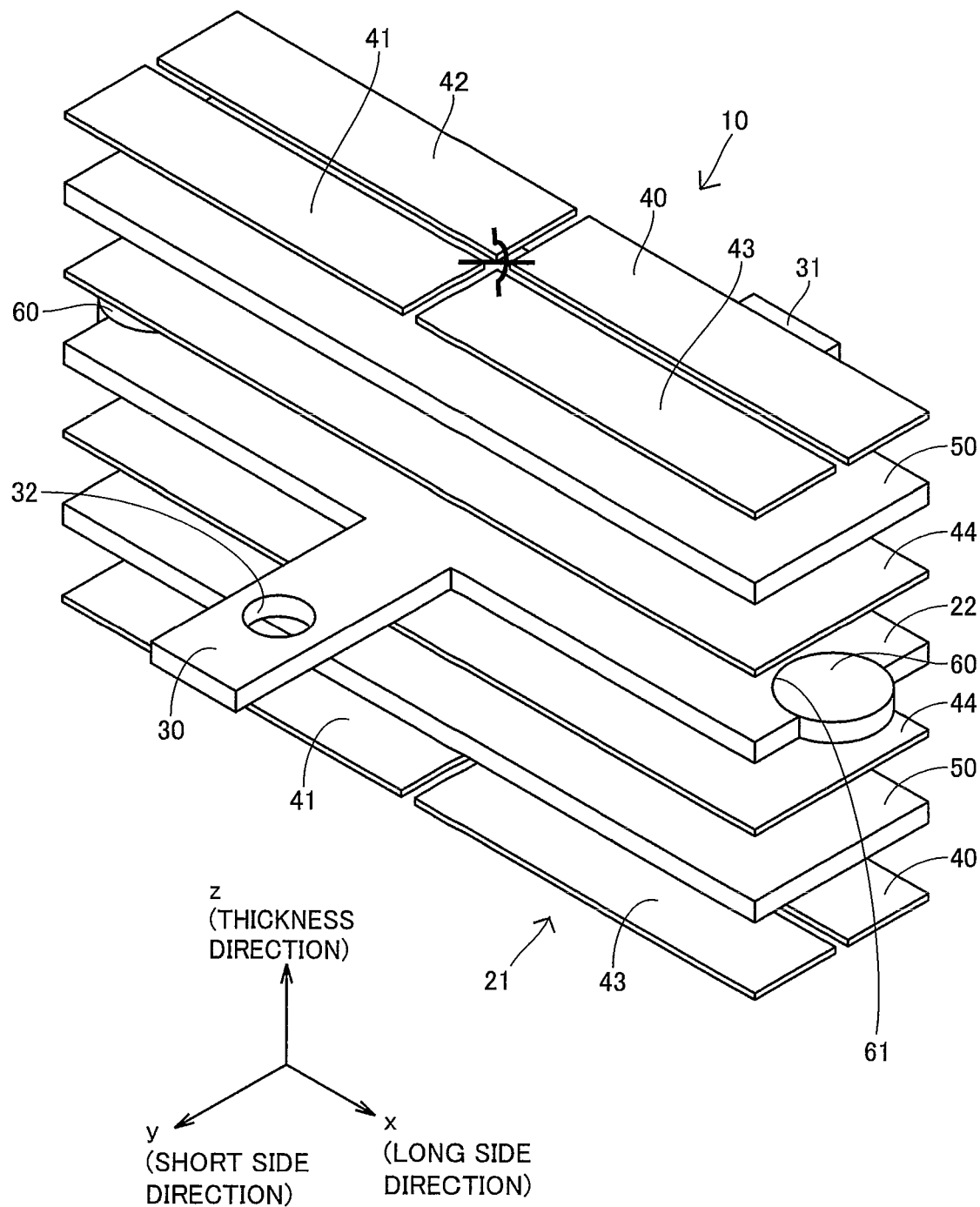
FIG. 2 is an exploded view of the ultrasonic vibrator of the first embodiment.

Referring to FIG. 2, the structure of ultrasonic vibrator 10 will now be described in detail. As shown in FIG. 2, ultrasonic vibrator 10 has vibration plate 21. Vibration plate 21 has support projection 30 fixed to vibrator support shaft 300, and also has a main plate 22 that is integral with support projection 30 and rotates rotor 200 by the vibration. Main plate 22 is a plate-like member of a substantially rectangular plane form having a width of 2 mm, length of 8 mm and thickness of 0.2 mm, and has a notch 61 of which inner peripheral surface has an arc-shaped section of 0.5 mm in radius of curvature.

Figure 3:
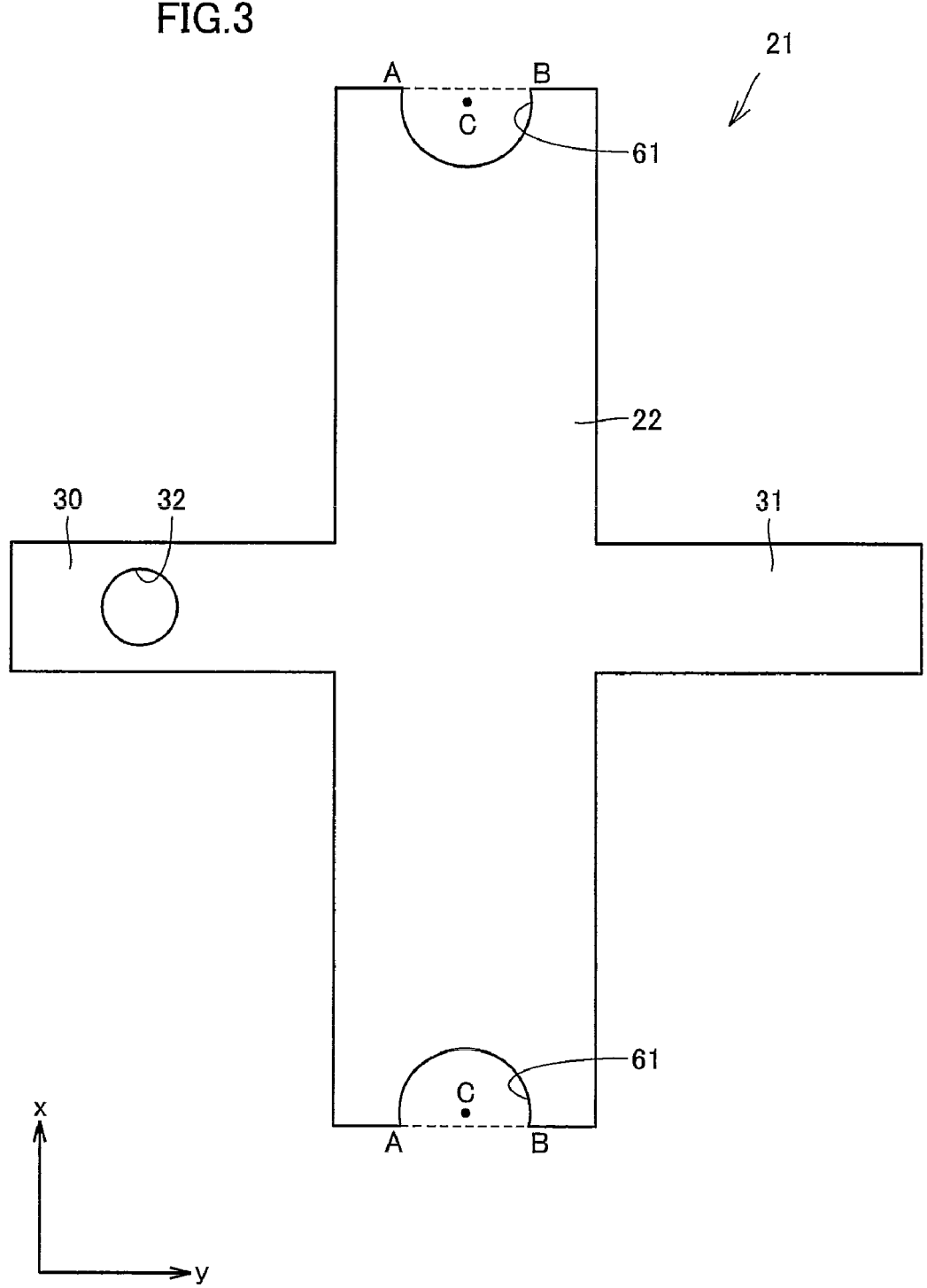
FIG. 3 is a plan of a vibration plate of the first embodiment.

Referring to FIG. 3, vibration plate 21 will be described below. As shown in FIG. 3, notch 61 is formed such that a center C of the arc defined by the inner peripheral surface of notch 61 is located on an inner side of main plate 22 with respect to line AB, assuming that A and B indicate crossing points between notch 61 and a short side of the rectangle of main plate 22, respectively.

Support projection 30 projects from one of the long sides of main plate 22, and extends in a direction parallel to the short side of main plate 22 from the midpoint of the long side of main plate 22. Support projection 30 is a plate-like member of a substantially rectangular plane form having a width of 1 mm, length of 2.5 mm and thickness of 0.2 mm. Support projection 30 has circular through hole 32 of 0.6 mm in diameter. The diameter of through hole 32 is 0.6 mm substantially equal to that of vibrator support shaft 300.

A distance between the midpoint of the long side of main plate 22 and a center of through hole 32 is 1.5 mm. Piezoelectric element 50 is a plate-like member of a rectangular plane form having a width of 2 mm, length 8 mm and thickness of 0.2 mm. Piezoelectric element 50 is fixed to main plate 22 with long sides thereof aligned to each other, and an electrode 44 is interposed therebetween.

The function of ultrasonic vibrator 10 is to convert an externally provided electric signal to a mechanical elliptic motion. The sizes and forms of vibration plate 21 and piezoelectric element 50 are not restricted to the above, provided that the above function is implemented. The material of vibration plate 21 is not particularly restricted, but is desirably an electrically conductive material such as stainless steel having better workability and shock resistance than foregoing piezoelectric element 50.

Support projection 30 and main plate 22 may be made of independent members, respectively, but are desirably formed of one integral member. Piezoelectric element 50 is made of a lead (Pb) Zirconate Titanate (PZT), and may be made of any material such as a piezoelectric material, provided that it vibrates when a voltage is applied thereto.

Electrodes 40, 41, 42 and 43 are attached to one of the main surfaces of piezoelectric element 50. Electrodes 40, 41, 42 and 43 are plate-like members having the same rectangular plane form, respectively. Assuming that the one main surface of piezoelectric element 50 is divided substantially equally and imaginarily into four rectangular regions, electrodes 40, 41, 42 and 43 are arranged in these four rectangular regions, respectively.

Electrode 44 of a substantially rectangular form is arranged on the other main surface of piezoelectric element 50. Electrode 44 is the plate-like member having substantially the same rectangular plane form as the other main surface of piezoelectric element 50. In ultrasonic vibrator 10 of this embodiment, two piezoelectric elements 50 are arranged on the one and other main surfaces of main plate 22, respectively, and electrode 44 is interposed between main plate 22 and each piezoelectric element 50. Each of two electrodes 44 is fixed to the one or other main surface of main plate 22 with its long side being parallel to the long side of main plate 22. Two electrodes 44 are adhered to main plate 22 by an electrically conductive adhesive such as silver paste.

Piezoelectric element 50 attached to the one main surface of vibration plate 21 and electrodes 40, 41, 42, 43 and 44 attached to piezoelectric element 50 are mirror images, in the direction of the thickness of vibration plate 21, of piezoelectric element 50 attached to the other main surface of vibration plate 21 and electrodes 40, 41, 42, 43 and 44 attached thereto.

Piezoelectric element 50 is polarized in its thickness direction, and the direction of the polarization is symmetrical in the thickness direction of vibration plate 21. Therefore, the vibration characteristic of piezoelectric element 50 on the one main surface of vibration plate 21 is substantially the same as that on the other main surface of vibration plate 21. Since main plate 22 of vibration plate 21 is rectangular, the tip end of vibration plate 21 elliptically vibrates.

Main plate 22 is provided with a pushing projection 31 located in its midpoint of the long side that is opposed to the midpoint of the long side of main plate 22 where support projection 30 is arranged. One end of a linear rubber 600 is adhered or connected to pushing projection 31. The other end of linear rubber 600 is adhered or connected to a pushing force adjusting mechanism 700. Linear rubber 600 elastically pulls pushing projection 31 toward pushing force adjusting mechanism 700. Thereby, it is possible to adjust a pushing force applied by contact portion 60 of ultrasonic vibrator 10 to the outer periphery of rotor 200. Thus, a contact force between ultrasonic vibrator 10 and rotor 200 can be adjusted by adjusting the contractive force of linear rubber 600. The contractive force of linear rubber 600 can be adjusted by adjusting the length of the portion of linear rubber 600 wound around pushing force adjusting mechanism 700.

Contact portion 60 is fitted into notch 61 formed at one end of main plate 22. Contact portion 60 has a circular form. The radius of contact portion 60 preferably has a positive allowance with respect to a radius of curvature of notch 61, and thus is preferably and slightly larger than it. In this case, contact portion 60 is forcedly fitted into notch 61 without a space therebetween. However, when contact portion 60 can be attached to notch 61, the radius of contact portion 60 may be equal to the radius of curvature of notch 61, or may have a negative allowance with respect to it (i.e., it may be slightly smaller than it). In other words, contact portion 60 and notch 61 may be attached together by fitting (engagement). In this case, it is desired that contact portion 60 and notch 61 are joined together by an adhesive for reinforcing the joint.

Contact portion 60 is in contact with an outer periphery of rotor 200 for transmitting the elliptic motion of ultrasonic vibrator 10 to rotor 200 by the friction between contact portion 60 and rotor 200. The material of contact portion 60 is different from that of main plate 22. Main plate 22 is preferably made of a ceramic material harder than main plate 22, and is more preferably made of a silicon nitride ceramic as will be described later.

Referring to FIGS. 4 to 7, description will be given on a drive method of ultrasonic vibrator 10 of the embodiment. There are various methods for driving ultrasonic vibrator 10. However, this embodiment will be described in connection with the manner of driving ultrasonic vibrator 10 by simultaneously exciting ultrasonic vibrator 10 in a longitudinal primary resonation mode and a bending (deflection) secondary resonation mode. This manner is implemented by supplying electric signals from external control device 500 (not shown) to electrodes 40, 41, 42, 43 and 44 arranged on two piezoelectric elements 50.

The signals (applied voltages) are provided to electrodes 40, 41, 42, 43 and 44 arranged on one of the main surface sides of vibration plate 21 in a fashion that is a mirror image, with respect to main plate 22, of that of the signal (voltages) application to electrodes 40, 41, 42, 43 and 44 arranged on the other side of vibration plate 21.

Figure 4:
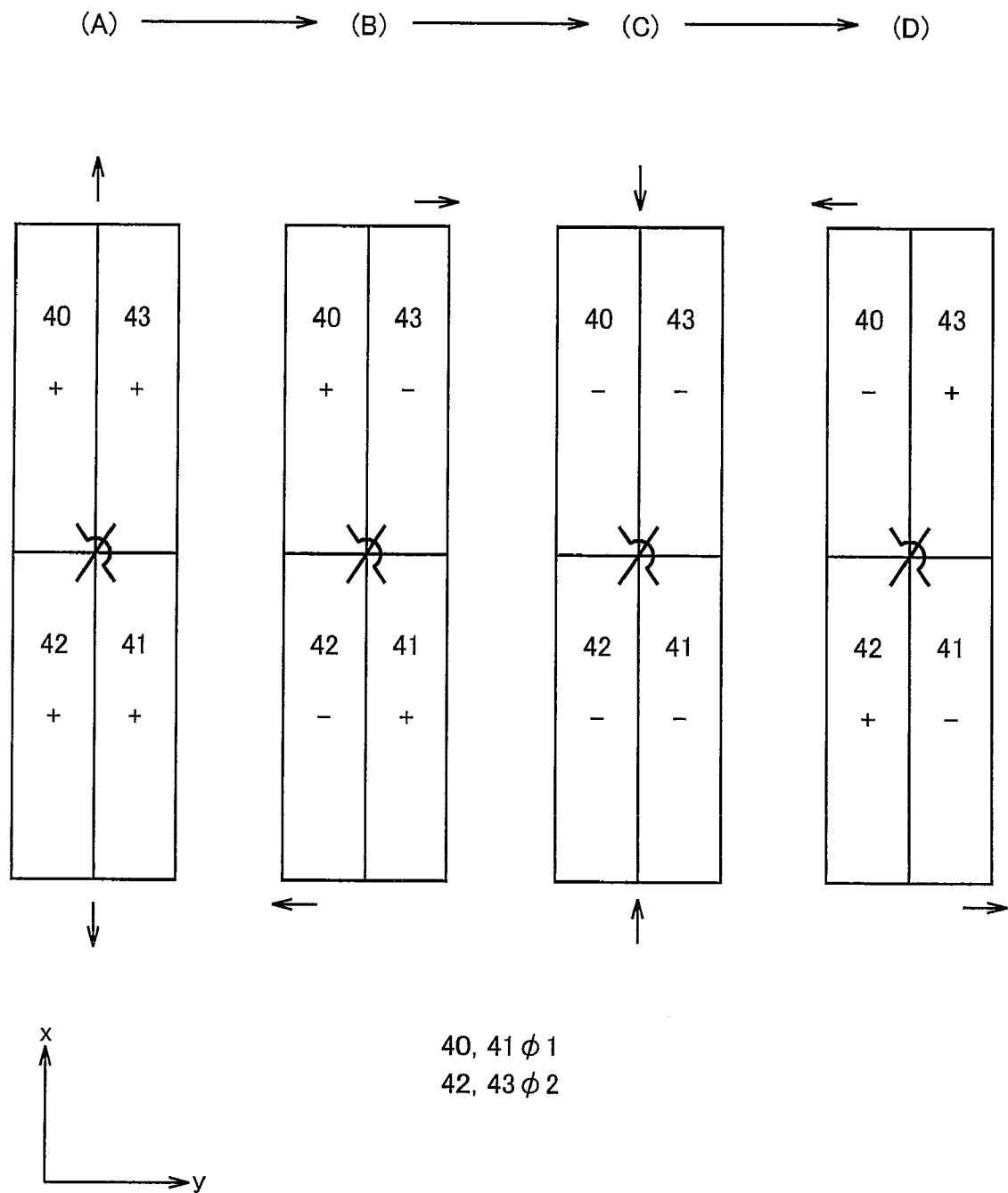
FIG. 4 shows four modes of signals provided to electrodes of the ultrasonic vibrator of the first embodiment.

As shown in FIG. 4, electrodes 40 and 41 are electrically connected together for receiving the same signal ($\phi$1). Electrodes 42 and 43 are electrically connected together for receiving the same signal (φ2). Therefore, the signals provided to electrodes 40, 41, 42 and 43 have four modes (A), (B), (C) and (D) as shown in FIG. 5. As shown in FIG. 5, the signal provided to electrodes 40 and 41 has the same frequency and amplitude as those of the signal provided to electrodes 42 and 43, but has the phase shifted by 90 degrees from that of the signal provided to electrodes 42 and 43.

In vibration plate 21 of ultrasonic vibrator 10 described above, resonance frequencies of the primary longitudinal resonation and secondary bending resonation are substantially equal to about 240 kHz. Therefore, when the foregoing signals are provided to electrodes 40, 41, 42, 43 and 44, main plate 22 performs the vibration formed of a combination of the primary longitudinal resonation shown in FIG. 6 and the secondary bending resonation shown in FIG. 7.

Figure 6:
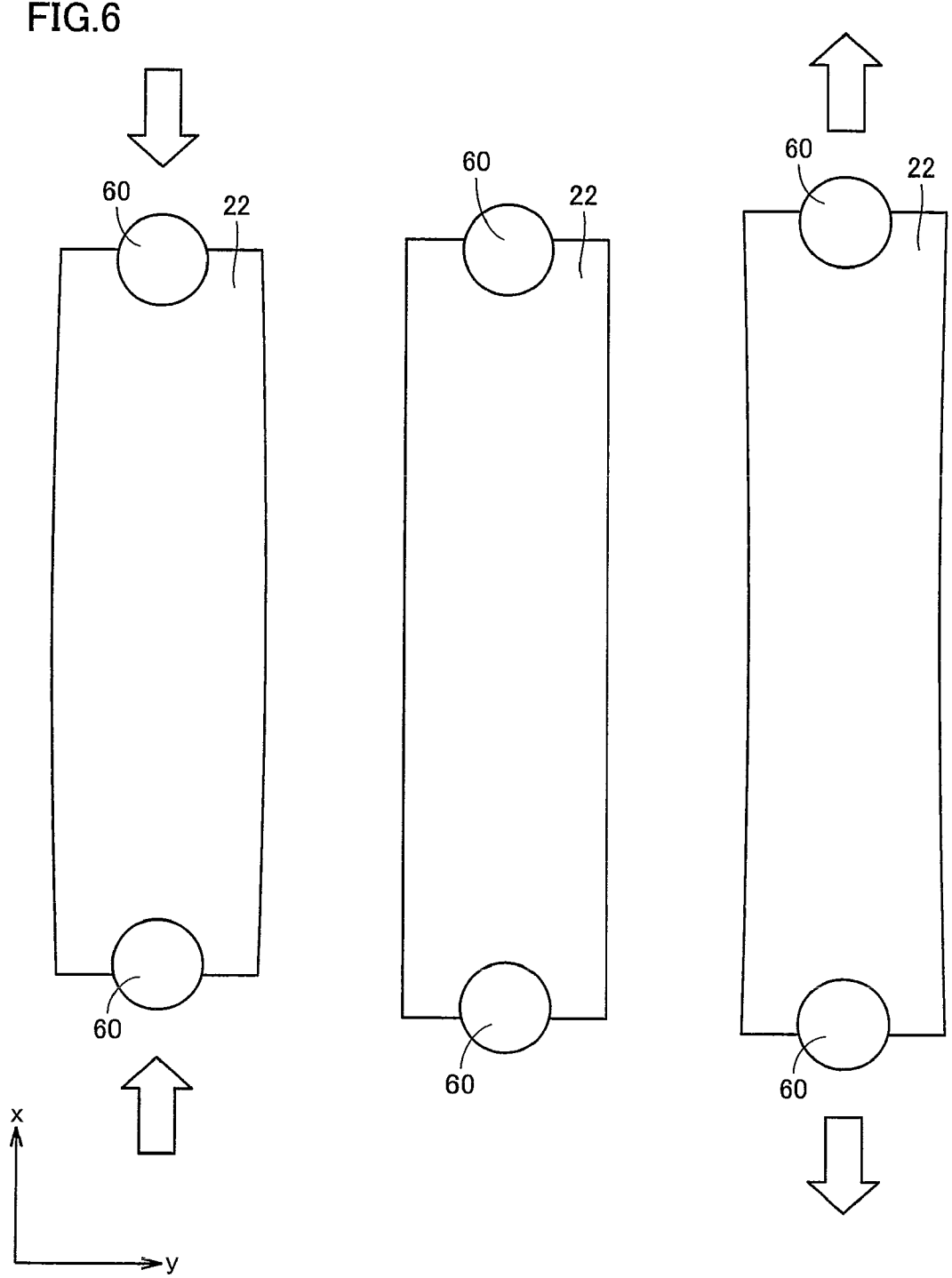
FIG. 6 schematically shows a longitudinal vibration on an x-y plane occurring in the ultrasonic vibrator of the first embodiment.

According to the longitudinal vibration shown in FIG. 6, vibration plate 21 contracts and expands in the direction of the long side as indicated by hollow arrows. According to the bending (deflection) vibration shown in FIG. 7, vibration plate 21 changes between one S-shaped form and the other S-shaped form that is a mirror image thereof.

Figure 7:
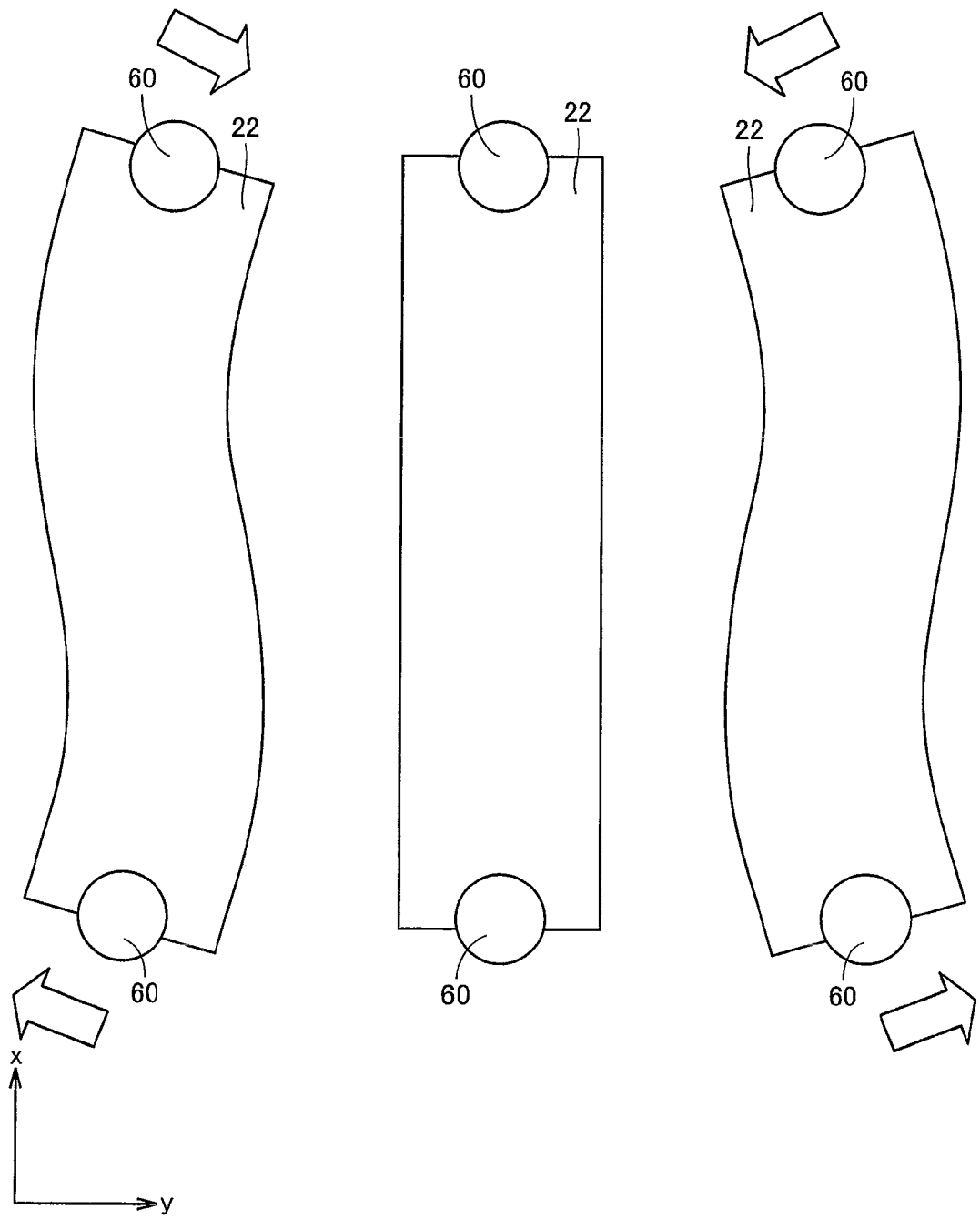
FIG. 7 schematically shows a bending vibration on the x-y plane occurring in the ultrasonic vibrator of the first embodiment.

When voltages changing with a frequency equal to the resonance frequency of the longitudinal vibration are applied to electrodes 40, 41, 42 and 43 with the same phase, vibration plate 21 performs the longitudinal vibration in the direction shown in FIG. 6. When electrodes 40 and 41 receive the voltage changing with a frequency equal to the resonance frequency of the bending vibration, and electrodes 42 and 43 receive the voltage that has the same frequency as the voltage applied to electrodes 40 and 41 as well as the phase opposite to that of the voltage applied to electrodes 40 and 41, vibration plate 21 performs the bending vibration as shown in FIG. 7. Each of two electrodes 44 always is set to a reference potential of 0V.

In vibration plate 21, the resonance frequency of the longitudinal vibration shown in FIG. 6 is substantially equal to the resonance frequency of the bending vibration shown in FIG. 7, and electrodes 40 and 41 are supplied with the voltage of the same phase and the frequency equal to the resonance frequency of the longitudinal vibration and the resonance frequency of the bending frequency. Also, electrodes 42 and 43 are supplied with the voltage that has the same frequency as the voltage applied to electrodes 40 and 41 as well as the phase shifted by +90 degrees from the phase of the voltage applied to electrodes 40 and 41. Thereby, the longitudinal vibration and the bending vibration simultaneously occur in ultrasonic vibrator 10. Consequently, contact unit 60 performs the elliptic motion as indicated by a reference symbol E1 in FIG. 1.

When electrodes 42 and 43 are supplied with the voltage that has the same frequency as that supplied to electrodes 40 and 41 as well as the phase shifted by −90 degrees therefrom, the elliptic motion occurs in the direction opposite to that indicated by reference symbol E1 in FIG. 1. When the phase of the voltage supplied to electrodes 40 and 41 or the phase of the voltage supplied to electrodes 42 and 43 changes 180 degrees while the elliptic motion is being performed in a certain direction, the rotating direction of the elliptic motion of contact portion 60 is reversed, and the rotating direction of rotor 200 in contact with contact portion 60 is reversed.

Characteristics of ultrasonic motor 1 vary depending on the material of contact portion 60 as described below. Ultrasonic motor 1 drives rotor 200 by transmitting the vibration caused in ultrasonic vibrator 10 to rotor 200 by a frictional force. The frictional force depends on a friction coefficient between contact portion 60 and rotor 200, and the friction coefficient depends on the qualities of materials of contact portion 60 and rotor 200.

Ultrasonic motor 10 applies in advance a predetermined stress to rotor 200 at a contact point between contact portion 60 and rotor 200. The elliptic vibration occurring in ultrasonic vibrator 10 has an amplitude of several micrometers. Therefore, if contact portion 60 is made of a soft material, contact portion 60 deforms to absorb the elliptic vibration, and good drive characteristics may not be obtained. The drive characteristics of ultrasonic motor 1 significantly change depending on the combination of the materials of contact portion 60 and rotor 200. This can be seen from the following Table 1.

TABLE 1

| Material of Contact Portion | Maximum Output of Ultrasonic Motor |
|---|---|
| SUS | 1.0 (reference value) |
| Alumina ($Al_2O_3$) | 1.9 |
| Zirconia (ZrO) | 1.3 |
| Silicon Nitride ($Si_3N_4$) | 2.7 |

The table 1 represents an experiment result indicating a relationship that is exhibited between the material of contact portion 60 and the output of ultrasonic motor 1 when rotor 200 is made of stainless steel (SUS). In the table 1, the maximum output exhibited by contact portion 60 made of the stainless steel (SUS) is assumed as "1", and the maximum outputs achieved by respective materials of the contact portion are given.

The material of contact portion 60 is stainless steel (SUS), alumina ceramic ($AL_2O_3$), zirconia ceramic (ZrO) or silicon nitride ceramic ($Si_3N_4$). As is shown in the table 1, when contact portion 60 is made of a ceramic material (alumina, zirconia or silicon nitride), the output can be larger than that obtained by stainless steel (SUS). When contact portion 60 is made of silicon nitride ($Si_3N_4$), the maximum output can be obtained.

In general, it is preferable that ultrasonic vibrator 10 is provided at each of its short sides of main plate 22 with notch 61 and contact portion 60 for improving the symmetric property of the elliptic vibration. However, even when notch 61 and contact portion 60 are formed at only the short side in contact with rotor 200, the object of the invention can be achieved.

Second Embodiment

Figure 8:
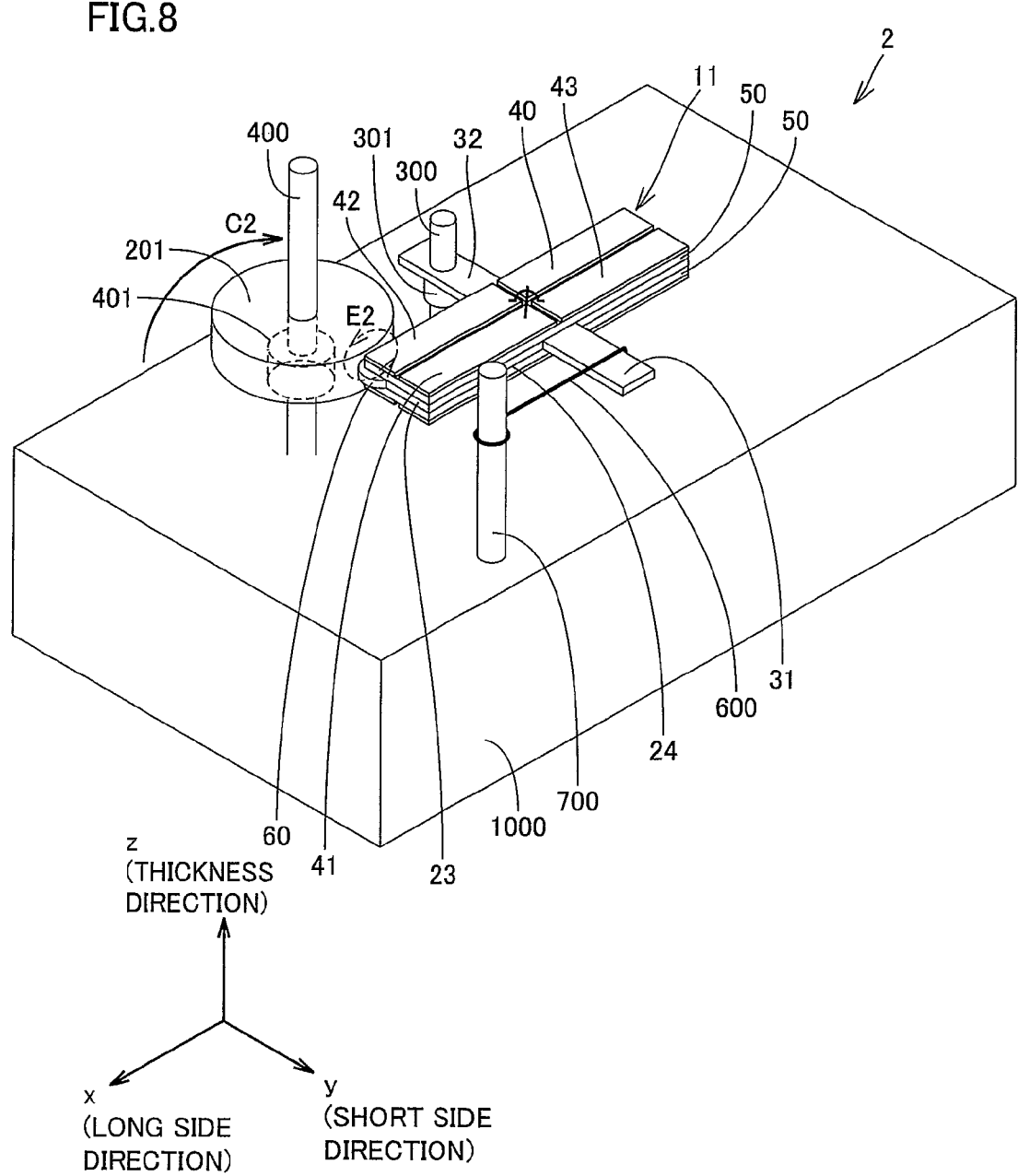
FIG. 8 is a perspective view of an ultrasonic motor of a second embodiment.
Figure 9:
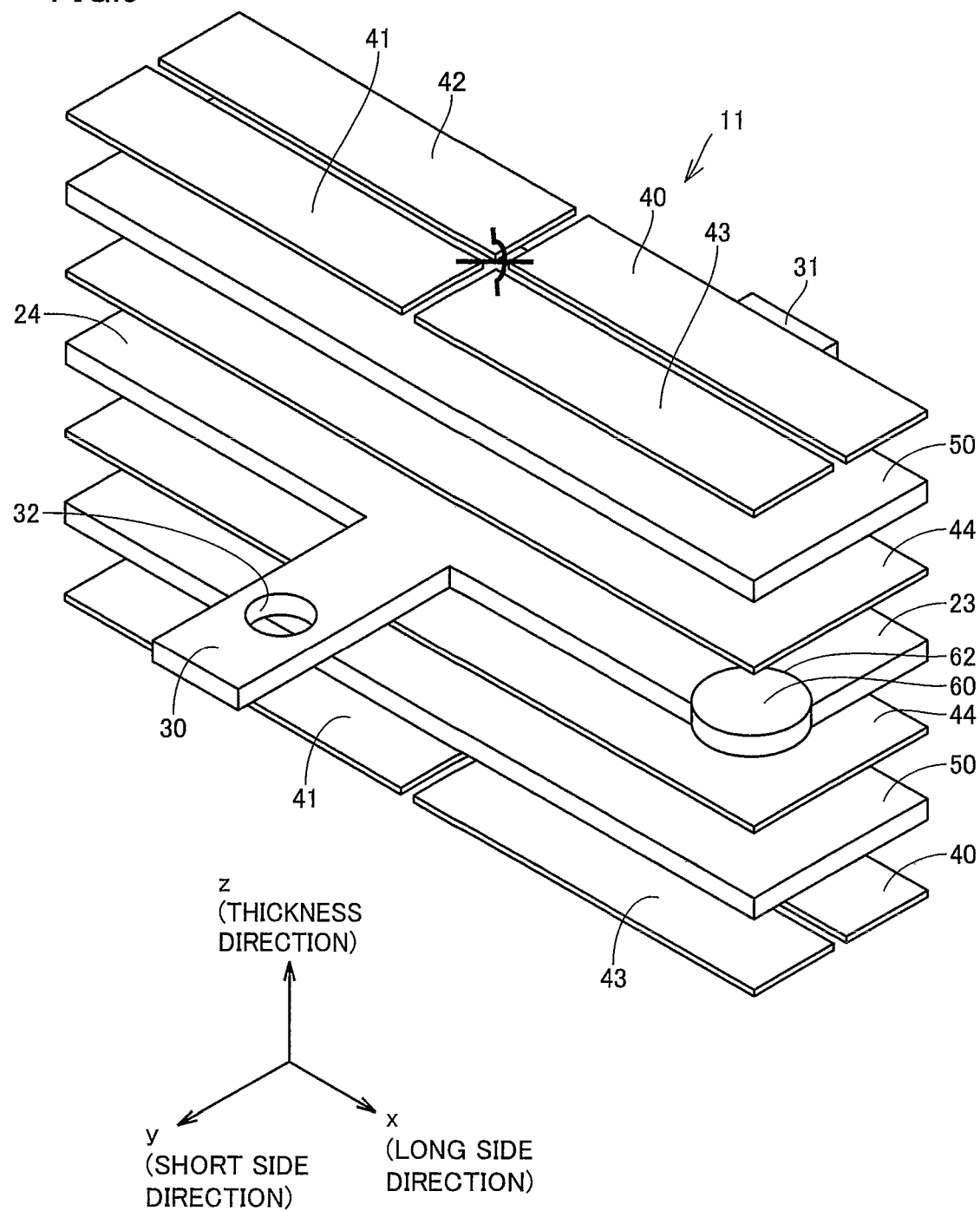
FIG. 9 is an exploded view of the ultrasonic vibrator of the second embodiment.
Figure 10:
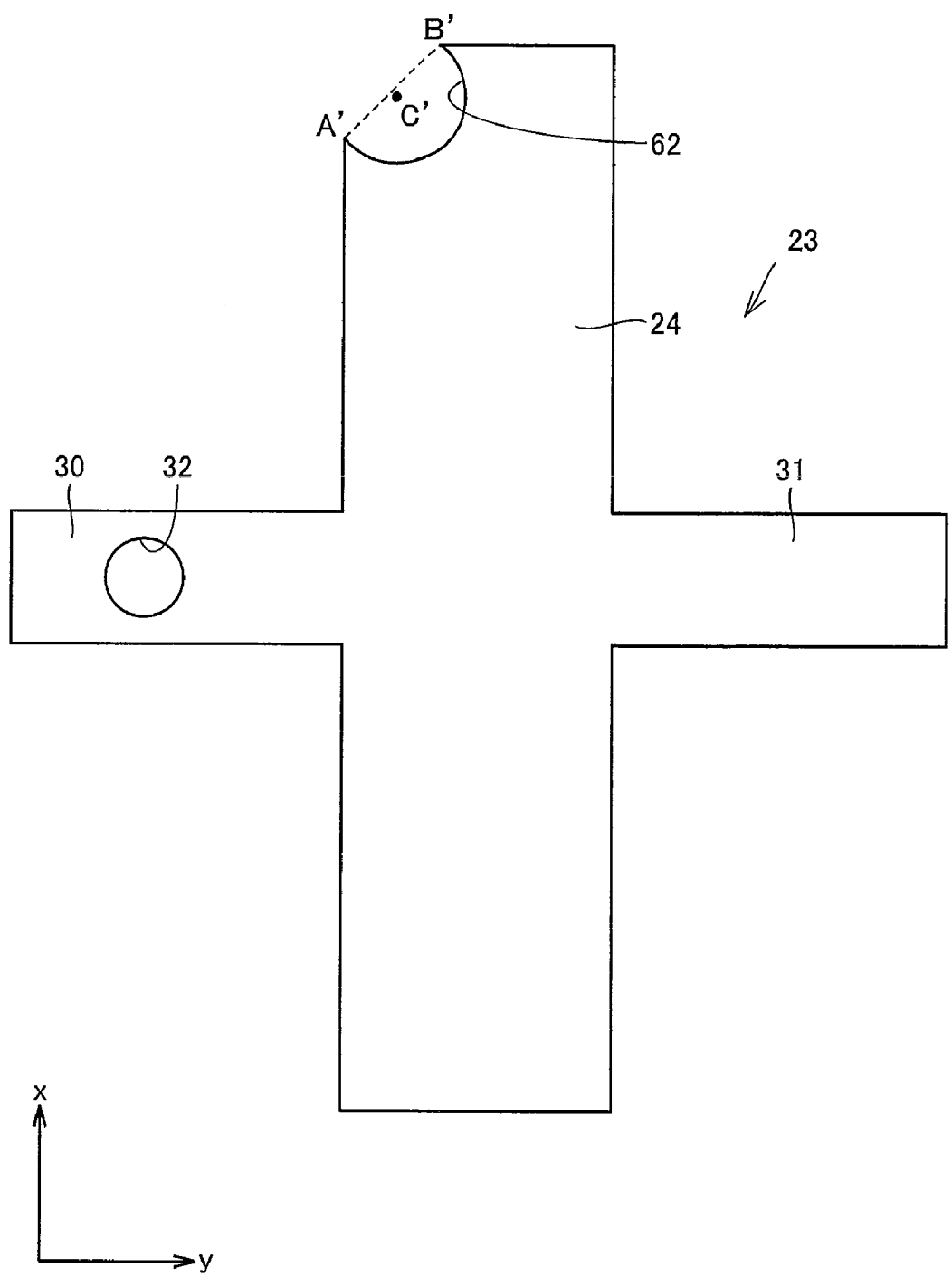
FIG. 10 is a plan of a vibration plate of the second embodiment.

Referring to FIGS. 8 to 10, description will be given on an ultrasonic motor 2 of the second embodiment of the invention. As shown in FIGS. 8 and 9, ultrasonic motor 2 includes an ultrasonic vibrator 11 and a rotor 201. Components that implement the same structures or functions as those of ultrasonic motor 1 in the first embodiment bear the same reference numbers, and description thereof is not repeated.

Ultrasonic vibrator 11 according to this embodiment includes piezoelectric element 50, electrodes 40, 41, 42, 43 and 44, and pushing projection 31 that have the same sizes and forms as the ultrasonic vibrator already described in connection with the first embodiment.

Ultrasonic vibrator 11 has a vibration plate 23. Vibration plate 23 has support projection 30 fixed to vibrator support shaft 300 and a main plate 24 that is formed integrally with support projection 30 for rotating rotor 201 by the vibration.

Main plate 24 is a plate-like member of a substantially rectangular plane form having a width of 2 mm, length of 8 mm and thickness of 0.2 mm, and has an arc-shaped notch 62 of 0.5 mm in radius of curvature.

Vibration plate 23 will be described below with reference to FIG. 10. As shown FIG. 10, notch 62 is arranged such that the center of the arc of notch 62 is located on the inner side of main plate 24 with respect to line A'B', assuming that A' indicates a crossing point between notch 62 and a long side of the rectangle of main plate 24, and B' indicates a crossing point between notch 62 and a short side of the rectangular of main plate 24. Contact portion 60 is attached to notch 62 of main plate 24. The radius of contact portion 60 preferably has a positive allowance with respect to the radius of curvature of notch 62. In this case, contact portion 60 is forcedly fitted into notch 62 and thus is joined thereto without a space therebetween. However, if contact portion 60 can be attached to notch 62, the radius of contact portion 60 may be equal to that of notch 62, or may have a negative allowance with respect to it, and contact portion 60 and notch 62 may be attached together by press fitting or forced fitting (engagement). In this case, contact portion 60 and notch 62 may be joined together by an adhesive for reinforcing the joint portion.

According to the embodiment, contact portion 60 is arranged on one of the corners of main plate 24.

Ultrasonic motor 2 of the invention may have any structure provided that ultrasonic vibrator 11 is in contact with rotor 201 and generates the desired elliptic vibration. Therefore, it is not restricted to the ultrasonic motor having the structures of the following embodiments. For example, the sizes, forms, materials and the like of the ultrasonic vibrator are not restricted provided that the object and effect of the invention can be achieved.

An end of linear rubber 600 is adhered or tied to pushing projection 31. The other end of linear rubber 600 is adhered or tied to pushing force adjusting mechanism 700. A contraction force of linear rubber 600 pulls pushing projection 31 toward pushing force adjusting mechanism 700. Thereby, it becomes possible to adjust the pushing force applied to the outer periphery of rotor 201 by contact portion 60 of ultrasonic vibrator 11. Thus, the contact force between ultrasonic vibrator 11 and rotor 201 is adjusted by adjusting the contraction force of linear rubber 600.

Then, description will be given on the drive method of ultrasonic motor 2 of the second embodiment. Various methods are available for driving ultrasonic vibrator 11. However, this embodiment will be described in connection with a manner of driving ultrasonic vibrator 11 by simultaneously exciting ultrasonic vibrator 11 in the longitudinal primary resonation mode and the bending (deflection) secondary resonation mode. Therefore, externally arranged control device 500 (not shown) applies electric signals to electrodes 40, 41, 42, 43 and 44 provided to two piezoelectric elements 50.

The signals provided to electrodes 40, 41, 42, 43 and 44 are the same as those applied to the electrodes in the first embodiment. Thus, the voltages are applied to electrodes 40, 41, 42, 43 and 44 in the manner shown in FIGS. 4 and 5. As described above, vibration plate 23 has contact portion 60, which is in contact with the outer peripheral surface of rotor 201. Therefore, when the signals shown in FIGS. 4 and 5 are supplied to electrodes 40, 41, 42 and 43, ultrasonic vibrator 11 performs the elliptic motion as indicated by E2 in FIG. 8, and rotor 201 rotates in a direction indicated by C2 in FIG. 8.

Figure 11:
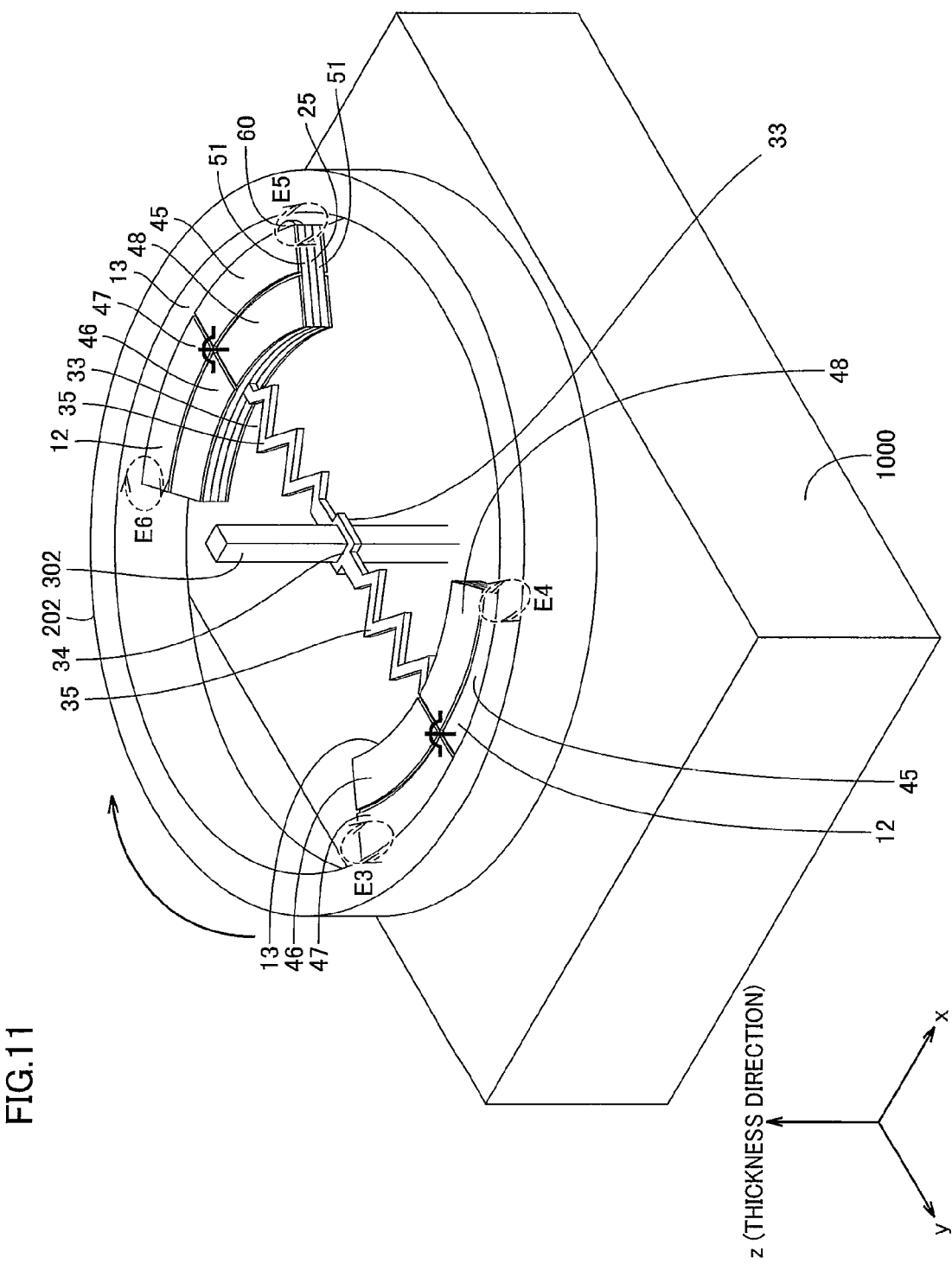
FIG. 11 is a perspective view of the ultrasonic motor of a third embodiment.

When one of the phase of the signal applied to electrodes 40 and 41 and the phase of the signal applied to electrodes 42 and 43 changes 180 degrees, the elliptic motion occurring in ultrasonic vibrator 11 is reversed from E2 in FIG. 11 so that rotor 201 rotates reversely to C2 in FIG. 11.

Third Embodiment

Referring to FIGS. 11 to 17, an ultrasonic motor 3 of the third embodiment of the invention will be described. Ultrasonic motor 3 includes two ultrasonic vibrators 12 of an arc-shaped plate type, a vibrator support shaft 302 and a rotor 202. Two ultrasonic vibrators 12 are mirror images of each other with respect to a predetermined plane containing a rotation axis of rotor 202 so that the following description will be given on only one of ultrasonic vibrators 12.

<Ultrasonic Vibrator>

Figure 12:
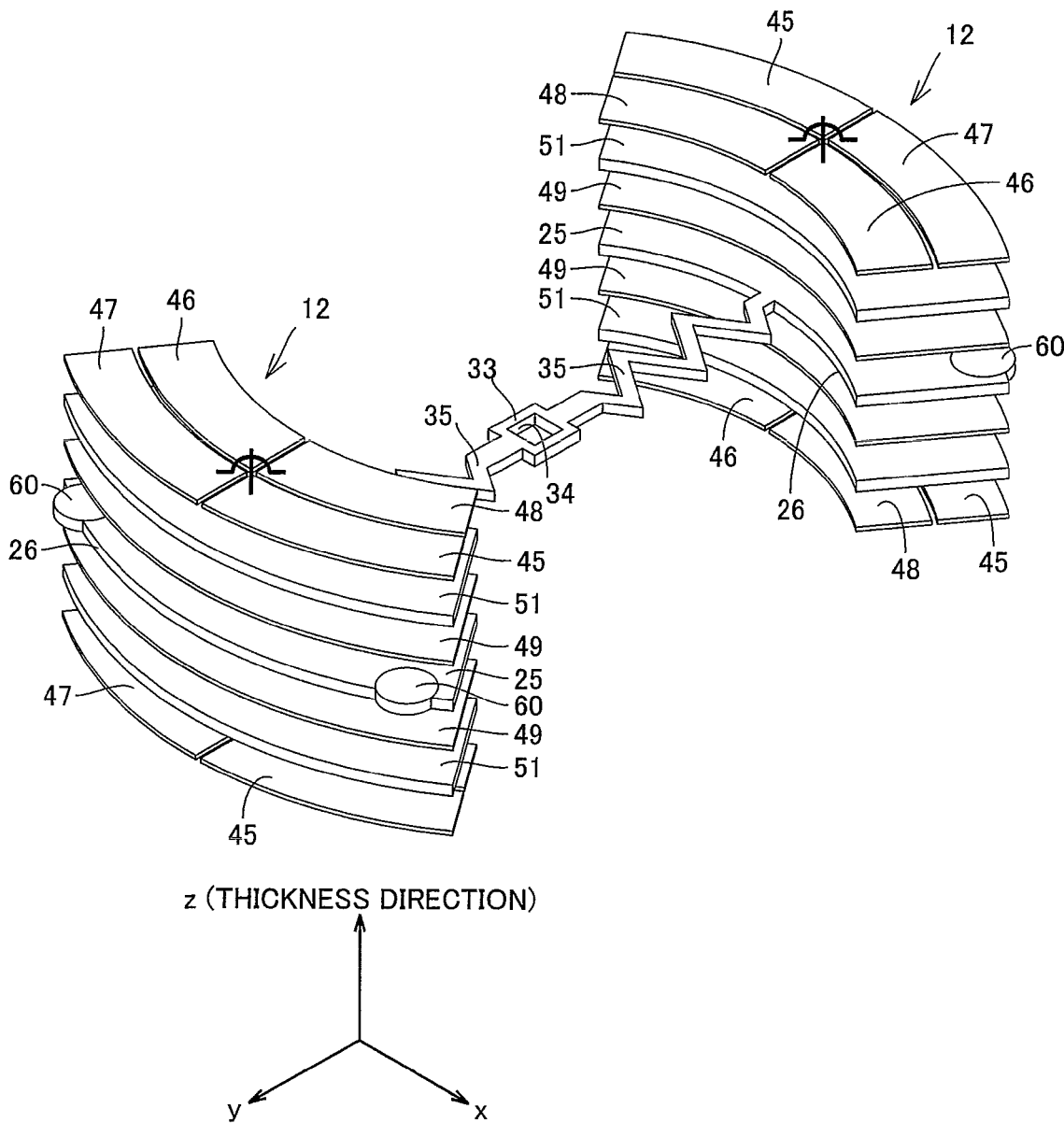
FIG. 12 is an exploded view of an ultrasonic vibrator of the third embodiment.

Referring to FIG. 12, the structure of ultrasonic vibrator 12 will be described more in detail. As shown in FIG. 12, ultrasonic vibrator 12 of the arc-shaped plate type includes a vibration plate 25. Vibration plate 25 has a support portion 33 connected to vibrator support shaft 302 in a manner fashion restricting a translational motion and a rotary motion in all the directions, and also has a main plate 26 that is integral with support portion 33.

Main plate 26 is formed of an arc-shaped plate having an inner diameter of 5.8 mm, outer diameter of 9.8 mm and central angle of 90 degrees. In the following description, a portion corresponding to an outer arc is referred to as an "outer peripheral portion" and a portion corresponding to an inner arc that has completely the same center as that of the outer arc is referred to as an "inner peripheral portion". Support portion 33 extends from a midpoint position of the inner peripheral portion of main plate 26. Support portion 33 is provided at its midpoint position with a square through hole 34 that is located on the x-y plane and has a side of 0.6 mm in length. Through hole 34 has substantially the same form as the outer form of vibrator support shaft 302. A spring 35 extends from through hole 34 in the center of support portion 33 to main plate 26. More specifically, two springs 35 that are present between through hole 34 and two main plates 26 of ultrasonic vibrators 12, respectively, have substantially the same spring length and the same spring constant (spring stiffness).

When the ultrasonic motor is viewed in a direction perpendicular to the x-y plane, the length of support portion 33 is set such that a distance from the center of through hole 34 to a point of contact between ultrasonic vibrator 12 of arc-shaped plate type and rotor 202 may be equal to the radius of rotor 202, i.e., the center of through hole 34 may match the rotation center of rotor 202.

Vibrator support shaft 302 and main plate 26 are connected together by spring 35, which is a compression spring that extends outward from the center of support portion 33. The length of support portion 33 is set such that the distance from the center of through hole 34 to the contact point between ultrasonic vibrator 12 and rotor 202 is longer than the radius of rotor 202 when spring 35 is in a free state. Thus, when ultrasonic vibrator 12 is arranged inside rotor 202 as shown in FIG. 11, spring 35 is compressed from the free state. Therefore, spring 35 holds ultrasonic vibrator 12 by pressing it against rotor 202.

A piezoelectric element 51 is an arc-shaped plate member having an inner diameter of 5.2 mm, outer diameter of 9.8 mm and central angle of 90 degrees. Upper piezoelectric element 51 is fixed to main plate 26 with an electrode 49 interposed therebetween such that the outer peripheral portions of upper piezoelectric element 51 and main plate 26 overlap together when the ultrasonic motor is viewed perpendicularly to the x-y plane. Lower piezoelectric element 51 is fixed to main plate 26 with electrode 49 interposed therebetween.

The function of ultrasonic vibrator 12 is to convert the externally applied electric signal to the mechanical elliptic motion. The sizes and forms of vibration plate 25 and piezoelectric element 51 are not restricted and may be different from those already described, provided that the above conversion function can be implemented. The material of main plate 26 is not particularly restricted, provided that it does not damp the vibration to a large extent, and can cause the elliptic motion of a larger amplitude than the resonance. It is desirable that main plate 26 is made of an electrically conductive material such as stainless steel. Support portion 33, spring 35 and main plate 26 may be made of independent members, respectively, and may also be formed of one integral member.

Piezoelectric element 51 is made of lead zirconate titanate (PZT), but may be made of any other material provided that the element can vibrate when it receives a voltage. Electrodes 45, 46, 47, 48 and 49 are attached to one of the main surfaces of each of two piezoelectric elements 51. As shown in FIG. 11, electrodes 45 and 47 are arranged on the radially outer side of the arc-shaped portion, and a boundary between them is located at the circumferentially middle portion so that electrodes 45 and 47 have the same area.

Electrodes 46 and 48 are arranged on the radially inner side of the arc-shaped portion, and a boundary between them is located at the circumferentially middle portion so that electrodes 46 and 48 have the same area. Further, a boundary between electrodes 45 and 48 as well as a boundary between electrodes 46 and 47 are present in a radially middle position between the outer and inner peripheries of the arc-shaped portion. Electrode 49 is arranged on the other main surface of each piezoelectric element 51. Electrode 49 is a plate-like member of an arc-shaped form that is the same as that of the other main surface of piezoelectric element 51.

Electrodes 49 on upper and lower piezoelectric elements 51 are fixed to the opposite surfaces of main plate 26, respectively, such that the outer peripheral portions of these electrodes 49 overlap the outer peripheral portion of main plate 26. Two electrodes 49 are adhered to main plate 26 by an electrically conductive adhesive such as silver paste. The electrically conductive adhesive may be configured to serve as two electrodes 49. In this case, the foregoing adhesion of main plate 26 and piezoelectric elements 51 is performed simultaneously with the formation of electrodes 49.

Two piezoelectric elements 51 attached to the opposite surfaces of main plate 26 are mirror images of each other with respect to the plane along main plate 26, i.e., the x-y plane. Electrodes 45, 46, 47, 48 and 49 attached to upper piezoelectric element 51 are mirror images of those attached to lower piezoelectric element 51 with respect to the x-y plane, respectively. Piezoelectric elements 51 are polarized in the thickness direction, and the polarization directions are symmetrical in the thickness direction of vibration plate 25.

Accordingly, piezoelectric element 51 on one of the main surfaces of vibration plate 25 has substantially the same vibration characteristic as that on the other main surface. Therefore, vibration plate 25 of this embodiment vibrates in the x-y plane direction as will be described later when voltages are applied symmetrically with respect to the x-y plane.

Figure 13:
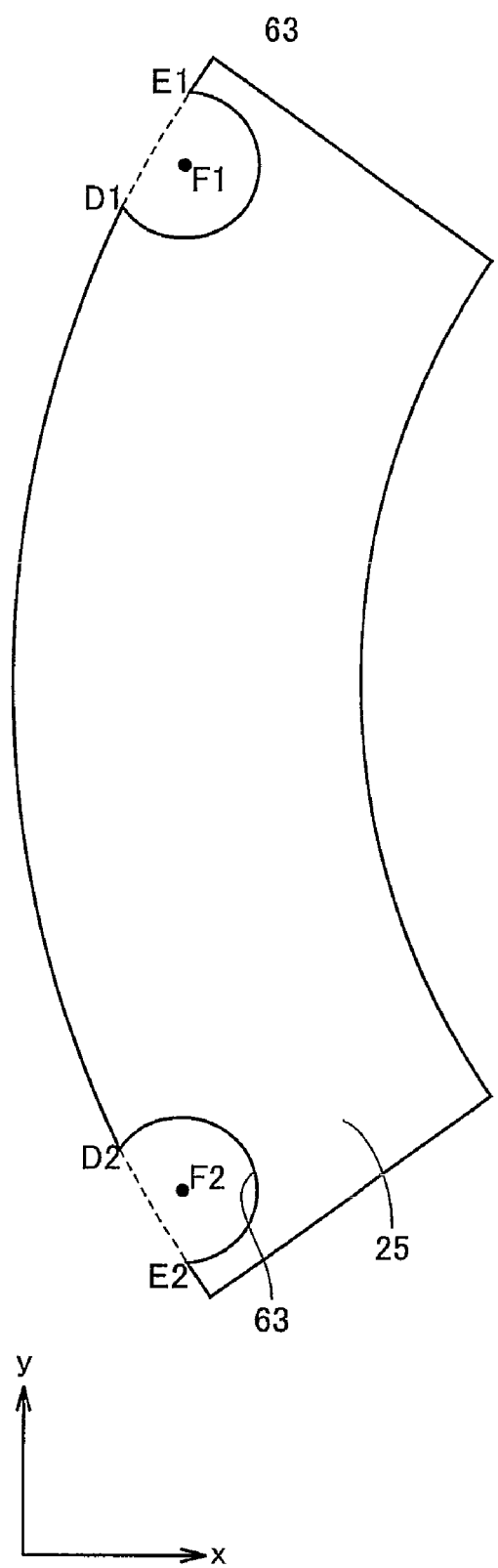
FIG. 13 is a plan of a vibration plate of the third embodiment.

FIG. 13 is a plan of main plate 26. As shown in FIG. 13, two notches 63 each having a radius of curvature of 0.5 mm are arranged near opposite ends of the radially outer portion of main plate 26, respectively. Assuming that D1, E1, D2 and E2 indicate the four crossing points between two notches 63 and the outer periphery of main plate 26, notches 63 are arranged such that centers F1 and F2 of the arcs of notches 63 are located on radially inner sides of main plate 26 with respect to line segment D1E1 and line segment D2E2, respectively.

Contact portion 60 is arranged in each notch 63 formed in main plate 26. The radius of contact portion 60 preferably has a positive allowance with respect to the radius of curvature of notch 63. In this case, contact portion 60 is forcedly fitted into notch 63 and thus is joined thereto without a space therebetween. However, when contact portion 60 is adhered to notch 63, the radius of contact portion 60 may be equal to the radius of curvature of notch 63, or may have a negative allowance with respect to it. In this structure, contact portion 60 and notch 63 are attached together by press fitting or forced fitting. In this case, contact portion 60 and notch 63 may be joined together by an adhesive for reinforcing the joint portion. Contact portion 60 is in contact with rotor 202 for transmitting the elliptic motion of ultrasonic vibrator 12 to rotor 202 by the frictional force.

Contact portion 60 is preferably made of a material different from that of main plate 26. It is preferable that contact portion 60 is made of a ceramic material harder than main plate 26 and particular is made of a silicon nitride ceramic.

Referring to FIGS. 14 to 17, description will be given on a drive method of ultrasonic vibrator 12 of the third embodiment. There are various methods for driving ultrasonic vibrator 12. However, this embodiment will be described in connection with the manner of driving ultrasonic vibrator 12 by simultaneously exciting ultrasonic vibrator 12 in the longitudinal primary resonance mode and the bending secondary resonance mode. For this manner, external control device 500 (not shown) supplies electric signals to electrodes 45, 46, 47, 48 and 49 provided to two piezoelectric elements 51.

For driving ultrasonic vibrator 12 of the arc-shaped plate type, externally arranged control device 500 (not shown) provides the predetermined signals to electrodes 45, 46, 47, 48 and 49. The signals (applied voltages) provided to electrodes 45, 46, 47, 48 and 49 arranged on one of the main surfaces of vibration plate 25 are mirror images of the signals (applied voltages) provided to electrodes 45, 46, 47, 48 and 49 on the other main surface of vibration plate 25 with respect to the x-y plane.

Figure 14:
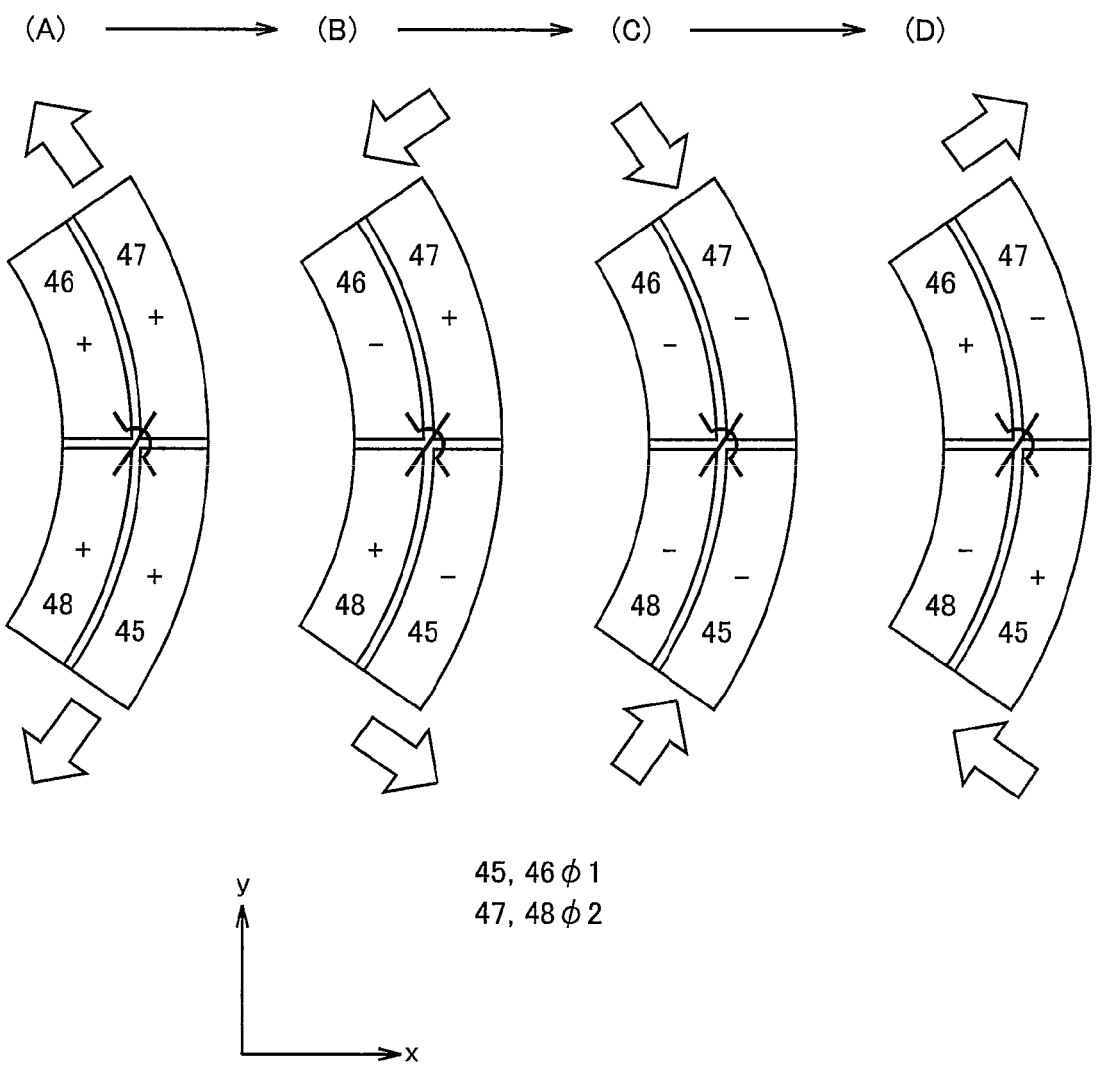
FIG. 14 shows four modes of the ultrasonic vibrator of the third embodiment.
Figure 15:
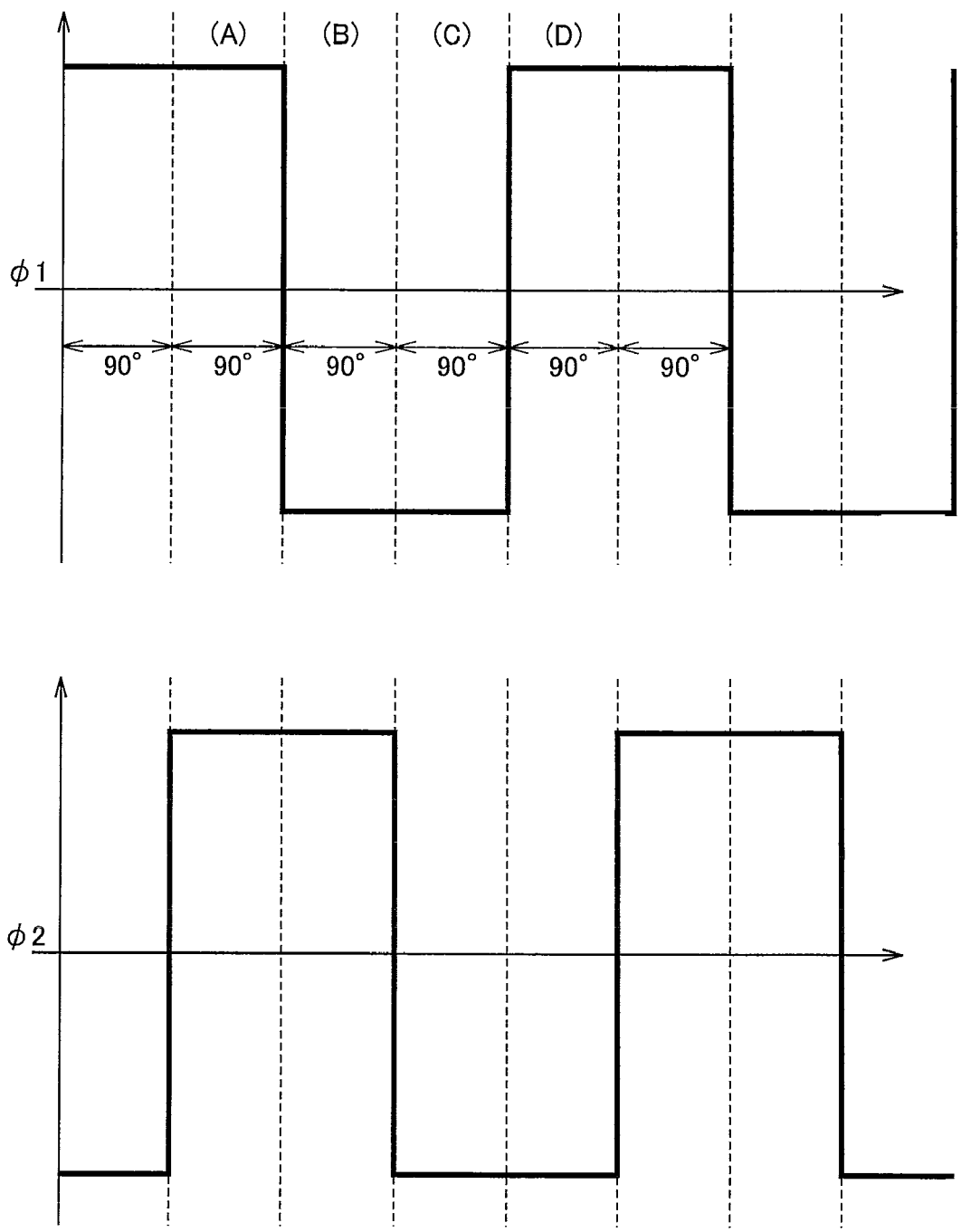
FIG. 15 shows phases of input voltages of the ultrasonic vibrator of the third embodiment.

As shown in FIG. 14, electrodes 45 and 46 are electrically connected together for receiving the same signal ($\phi 1$). Electrodes 47 and 48 are electrically connected together for receiving the same signal ($\phi 2$). Therefore, the signals provided to electrodes 45, 46, 47 and 48 have four modes (A), (B), (C) and (D) as shown in FIG. 15. As shown in FIG. 15, the signal provided to electrodes 45 and 46 has the same amplitude and frequency as the signal provided to electrodes 47 and 48, but has a phase shifted by 90 degrees therefrom.

Figure 16:
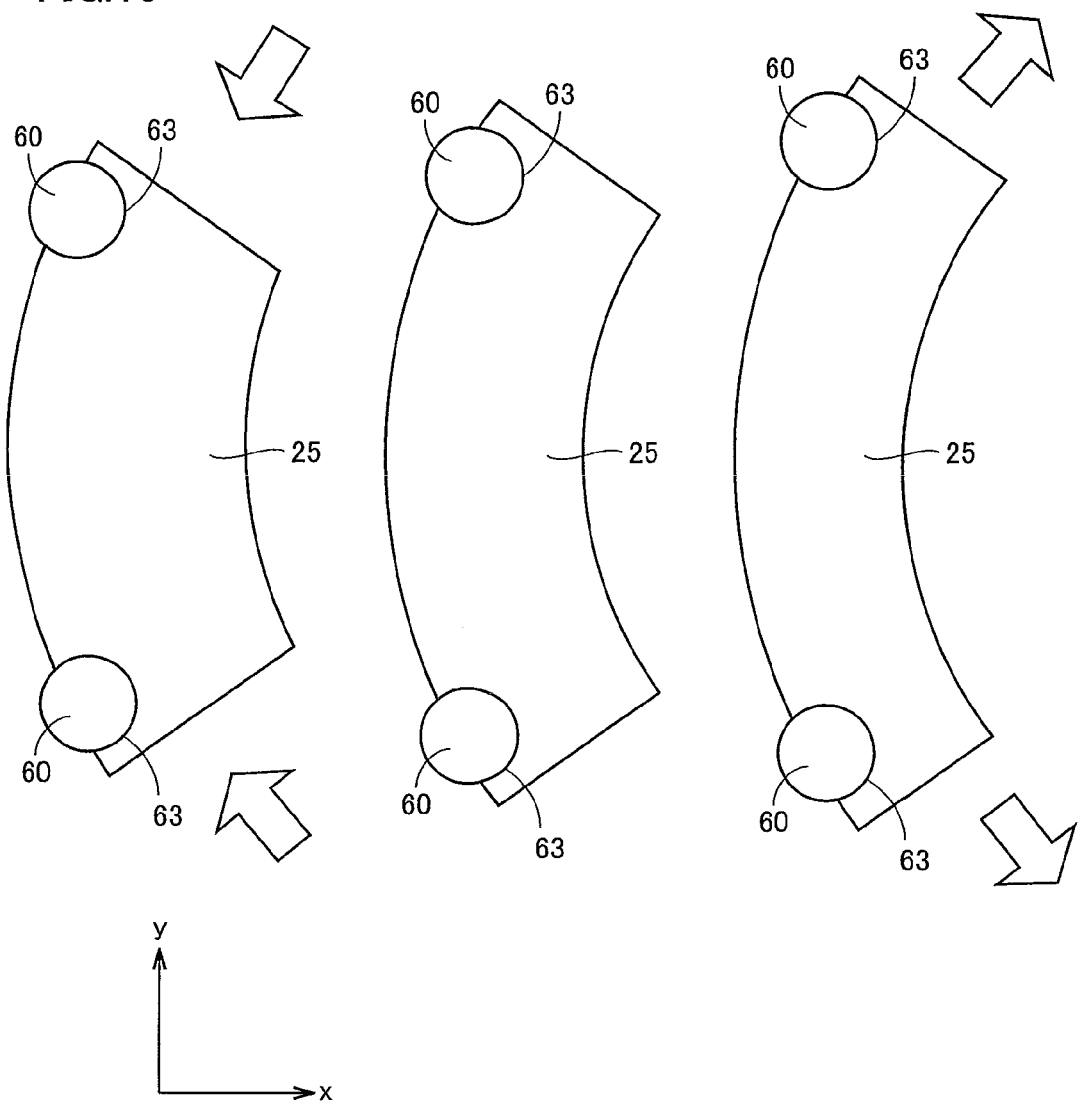
FIG. 16 schematically shows a longitudinal vibration on an x-y plane occurring in the ultrasonic vibrator of the third embodiment.
Figure 17:
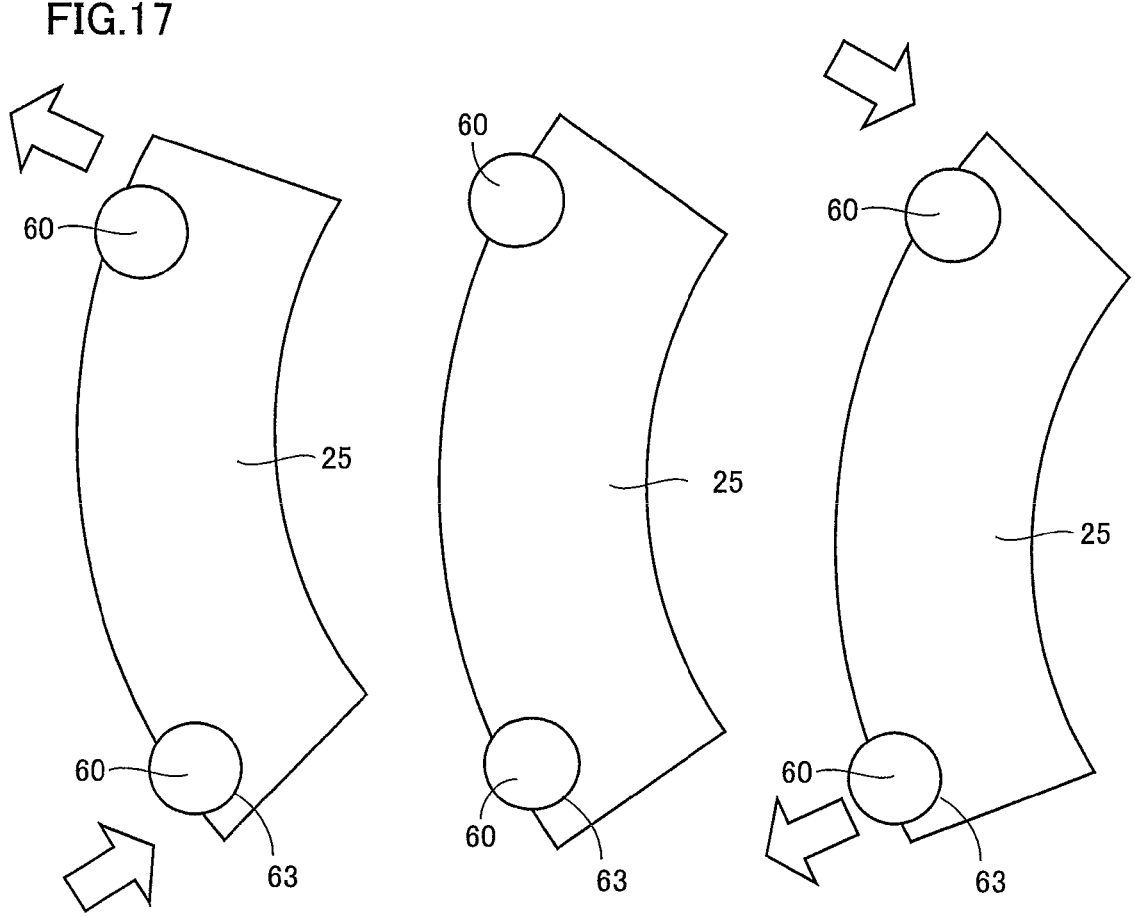
FIG. 17 schematically shows a bending vibration on the x-y plane occurring in the ultrasonic vibrator of the third embodiment.
Figure 18:
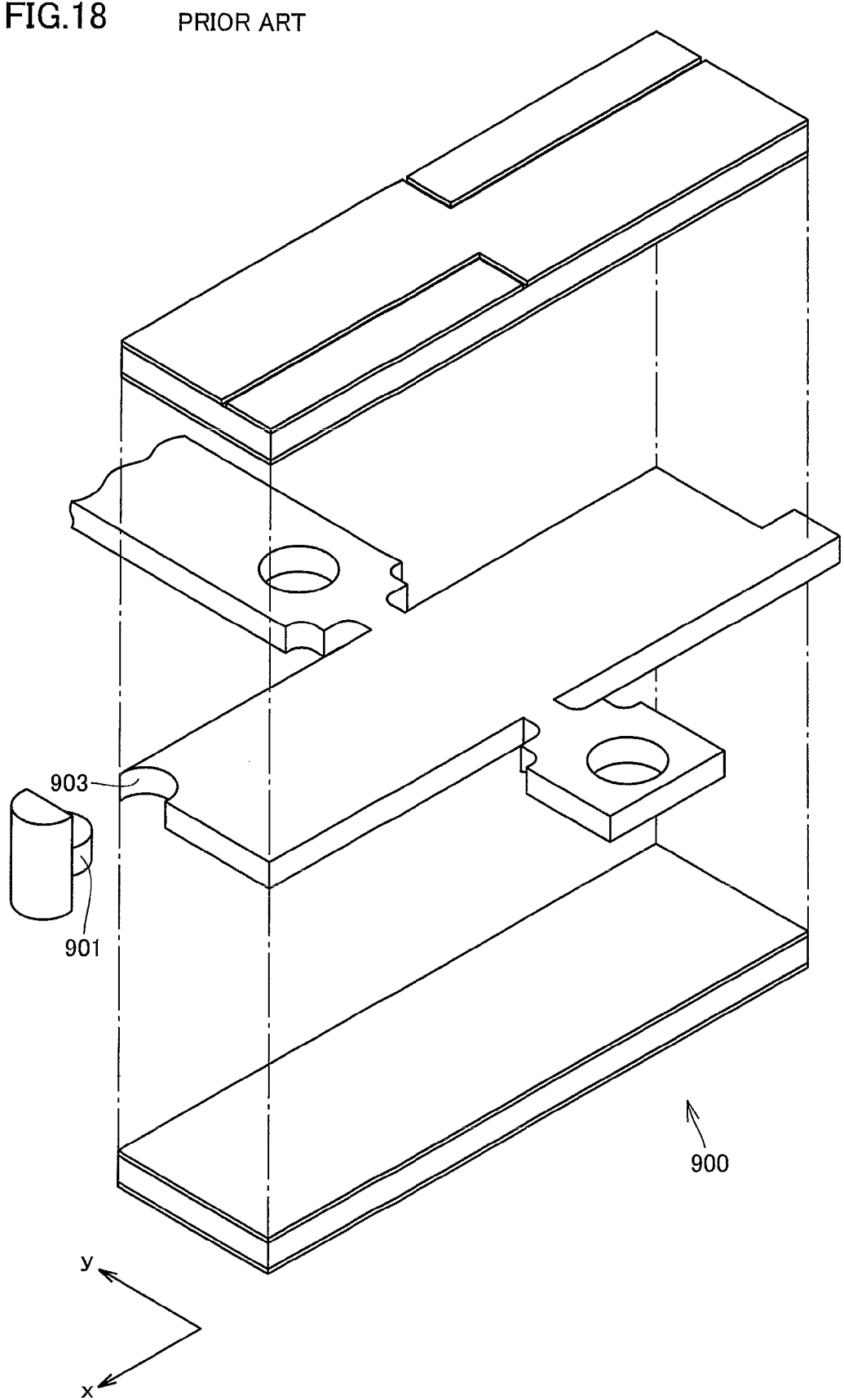
FIG. 18 schematically shows an ultrasonic vibrator disclosed in Japanese Patent Laying-Open No. 2005-073341.
Figure 19:
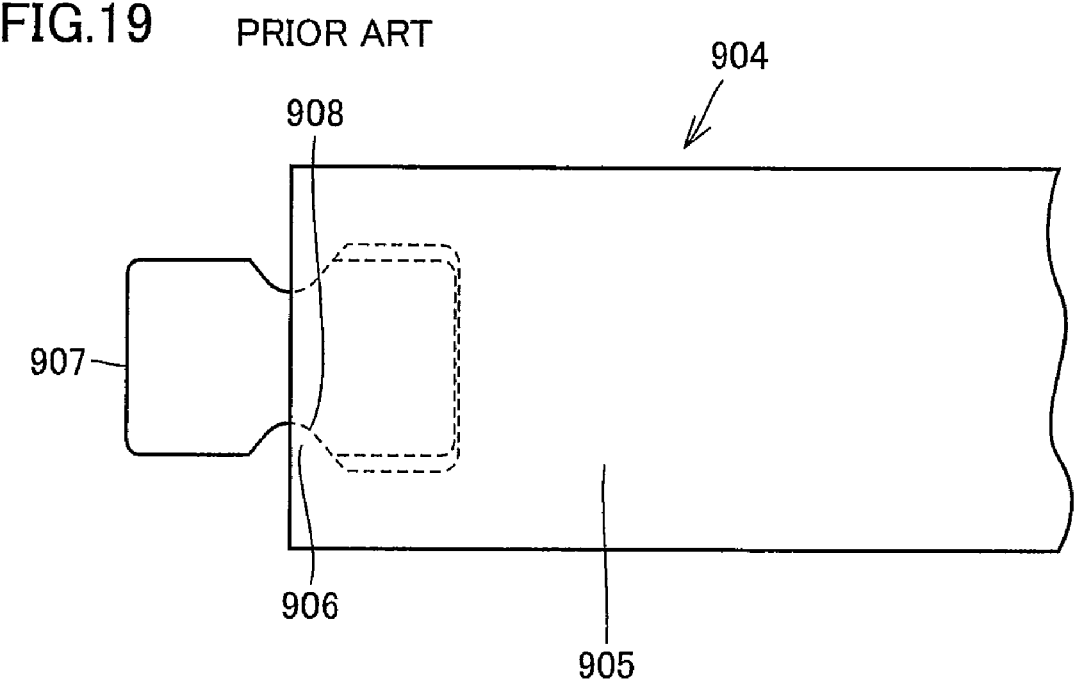
FIG. 19 schematically shows an ultrasonic vibrator disclosed in Japanese Patent Laying-Open No. 2005-073341.

Vibration plate 25 of ultrasonic vibrator 12 of the arc-shaped plate type described above performs a combination of the longitudinal vibration shown in FIG. 16 and the bending (deflection) vibration shown in FIG. 17. According to the longitudinal vibration shown in FIG. 16, vibration plate 25 contracts and expands in a tangential direction of rotor 202 as indicated by hollow arrows. Thereby, two contact portions 60 vibrate along the outer periphery of vibration plate 25, i.e., in the tangential direction of the inner peripheral surface of rotor 202. According to the bending vibration shown in FIG. 17, vibration plate 25 vibrates as indicated by hollow arrows. Thereby, two contact portions 60 of vibration plate 25 vibrate in the direction of the short side as indicated by the hollow arrows, i.e., in the tangential direction of the inner peripheral surface of the rotor.

When voltages changing with a frequency and a phase that are the same as those of the longitudinal vibration are applied to electrodes 45, 46, 47, 48 and 49, vibration plate 25 performs the expansion/contraction vibration in the direction indicated by the arrow in FIG. 16. When electrodes 45 and 46 receive the voltage changing with a frequency and a phase that are the same as those of the bending vibration, and electrodes 47 and 48 receive the voltage that has the same frequency as the voltage applied to electrodes 45 and 46 as well as the phase opposite to that of the voltage applied to electrodes 45 and 46, vibration plate 25 performs the bending vibration as indicated by arrows in FIG. 17. Each of two electrodes 49 always is set to a reference potential of 0V.

The form of the electrode is not restricted to the arc-shaped form, and may have any form provided that ultrasonic vibrator 12 of the arc-shaped plate type can generate both the contraction/expansion vibration and the bending vibration.

Both the resonance frequencies of the longitudinal vibration (resonance) and bending vibration (resonance) of vibration plate 25 are substantially equal to 350 kHz owing to its structures and sizes. Electrodes 45 and 46 receive the voltage of the frequency equal to the resonance frequency of the longitudinal and bending vibrations, and electrodes 47 and 48 receive the voltage that has the same frequency as that applied to electrodes 45 and 46 as well as the phase shifted by +90 degrees therefrom. Thereby, the longitudinal and bending vibrations of ultrasonic vibrator 12 of the arc-shaped plate type simultaneously occur in vibration plate 25. Consequently, four contact portions 60 perform the elliptic motions as indicated by arrows E3, E4, E5 and E6 in FIG. 11. Four contact portions 60 are arranged in the radially outer portions of the opposite ends of the two vibration plates 25, and are in contact with the inner peripheral surface of rotor 202 so that rotor 202 rotates in the circumferential direction.

When electrodes 46 and 47 receive the voltage that has the same frequency as the voltage applied to electrodes 45 and 46 as well as the phase shifted by -90 degrees therefrom, the elliptic motion occurs in the direction opposite to that indicated by arrows E3, E4, E5 and E6 in FIG. 11. When the phase of one of the signal applied to electrodes 45 and 46 and the signal applied to electrodes 47 and 48 changes 180 degrees, rotor 202 in contact with contact portion 60 of ultrasonic vibrator 12 of the arc-shaped plate type rotates in the reverse direction.

In each embodiment, the contact portion has the same thickness as the main plate. However, it is practically desired that the thickness of the contact portion is slightly smaller than that of the main plate. For example, when the main plate has the thickness of 0.2 mm, it is desired that the contact portion has the thickness of about 0.19 mm for the following reason. If the contact portion and the main plate have the same thickness, the contact portion may be fitted into the notch with the main surface of the contact portion projecting from the main surface of the main plate, due to difficulty in operation of fitting the contact portion into the notch. In this case, the contact portion supports the piezoelectric element so that the piezoelectric element to be adhered to the main plate cannot be in intimate contact with a nearly whole area of the main surface of the main plate. Accordingly, it becomes difficult to transmit the vibration of the piezoelectric element to the main plate. However, when the thickness of the contact portion is slightly smaller than the thickness of the main plate, the contact portion can be located within a range of the thickness of the main plate even if the attached contact portion is slightly shifted from the desired position. Therefore, the contact portion does not protrude outward from the main surface of the main plate. Accordingly, the piezoelectric element to be adhered to the main plate can be in intimate contact with the main surface of the main plate. In this case, a space is formed between the main surface of the contact portion and the piezoelectric element, but the area of the contact portion is much smaller than that of the main plate so that a problem of insufficient adhesivity between the vibration plate and the piezoelectric element does not occur. The elliptic motion of the vibration plate for driving a driven object occurs on a plane parallel to the main surface of the vibration plate. Further, the portions through which the vibration is transmitted from the vibrator to the contact portion are the connected portions of the main plate and contact portion, and these connected portions are firmly adhered or joined together without a space therebetween by the forced fitting or engagement (press fitting). Therefore, even when a space is formed between the contact portion and the piezoelectric element described above, a serious problem such as lowering of the drive force of the ultrasonic vibrator does not occur.

Each of the foregoing embodiments employs the circular contact portion. The purpose of this is to facilitate manufacturing of the contact portions and notches. The circular contact portion and the arc-shaped notch offer an advantage that the contact portion can be easily fitted into the notch, as compared with the case employing the contact portion and the notch having forms other than the above. When the contact portion is made of a brittle material such as ceramic, the contact portion of the circular plate-like form can offer an advantage that chipping of the contact portion can be suppressed, because it does not have a corner.

Although the ultrasonic motor described above employs the ultrasonic vibrator for rotating the rotor, it may be configured to reciprocate linearly a linear movable element by an ultrasonic vibrator.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An ultrasonic motor comprising:
   a driven object;
   a piezoelectric element for driving said driven object;
   a vibration plate including a notch having an inner peripheral surface of an arc-shaped form having a central angle larger than 180 degrees, and being vibrated by said piezoelectric element; and
   a contact portion made of a material different from that of said vibration plate, having a portion overlapping said piezoelectric element in a plan view and being smaller in thickness than said piezoelectric element, attached to said notch of said vibration plate by press fitting or forced fitting and being in contact with said driven object.

2. The ultrasonic motor according to claim 1, wherein said contact portion is a circular plate having a radius substantially equal to a radius of curvature of said arc-shaped form.

3. The ultrasonic motor according to claim 1, wherein said contact portion has a smaller thickness than said vibration plate.

4. The ultrasonic motor according to claim 1, wherein said contact portion is made of a material having a higher hardness than said vibration plate.

5. The ultrasonic motor according to claim 4, wherein said vibration plate is made of a metal material, and said contact portion is made of a ceramic material.

6. The ultrasonic motor according to claim 5, wherein said metal material is stainless steel, and said ceramic material is silicon nitride ($Si_3N_4$).

7. The ultrasonic motor according to claim 1, wherein a portion of said vibration plate other than said notch has a substantially rectangular plate-like form.

8. The ultrasonic motor according to claim 7, wherein said arc-shaped form has a center located at a middle portion in a direction of a short side of said rectangular plate-like form.

9. The ultrasonic motor according to claim 7, wherein both ends of said arc-shaped form are located on a short side and a long side of said vibration plate of the rectangular plate-like form, respectively.

10. The ultrasonic motor according to claim 1, further comprising:
another notch and another contact portion having the same forms as said notch and said contact portions, respectively, in addition to said notch and said contact portion.

11. The ultrasonic motor according to claim 1, wherein said vibration plate has an arc-shaped outer peripheral surface,
said contact portion is arranged in a position of an end of said arc-shaped outer peripheral surface or in a position other than said position of said arc-shaped outer peripheral surface, and
said driven object is a rotor having a circular inner peripheral surface being in contact with said arc-shaped outer peripheral surface.

12. An ultrasonic vibrator comprising:
a piezoelectric element for driving a driven object;
a vibration plate including a notch having an inner peripheral surface of an arc-shaped form having a central angle larger than 180 degrees, and being vibrated by said piezoelectric element; and
a contact portion made of a material different from that of said vibration plate, having a portion overlapping said piezoelectric element in a plan view and being smaller in thickness than said piezoelectric element, attached to said notch of said vibration plate by press fitting or forced fitting and to be in contact with said driven object.

13. The ultrasonic vibrator according to claim 12, wherein said contact portion is a circular plate having a radius substantially equal to a radius of curvature of said arc-shaped form.

14. The ultrasonic vibrator according to claim 12, wherein said contact portion has a smaller thickness than said vibration plate.

15. The ultrasonic vibrator according to claim 12, wherein said contact portion is made of a material having a higher hardness than said vibration plate.

16. The ultrasonic vibrator according to claim 15, wherein said vibration plate is made of a metal material, and said contact portion is made of a ceramic material.

17. The ultrasonic vibrator according to claim 16, wherein said metal material is stainless steel, and said ceramic material is silicon nitride ($Si_3N_4$).

18. The ultrasonic vibrator according to claim 12, wherein a portion of said vibration plate other than said notch has a substantially rectangular plate-like form.

19. The ultrasonic vibrator according to claim 18, wherein said arc-shaped form has a center located at a middle portion in a direction of a short side of said rectangular plate-like form.

20. The ultrasonic vibrator according to claim 18, wherein both ends of said arc-shaped form are located on a short side and a long side of said vibration plate of the rectangular plate-like form, respectively.

21. The ultrasonic vibrator according to claim 12, further comprising:
another notch and another contact portion having the same forms as said notch and said contact portions, respectively, in addition to said notch and said contact portion.

* * * * *